(12) United States Patent
Takushima et al.

(10) Patent No.: US 7,521,660 B2
(45) Date of Patent: Apr. 21, 2009

(54) OPTICAL SIGNAL PROCESSOR AND OPTICAL SIGNAL PROCESSING METHOD FOR PROCESSING OPTICAL SIGNALS IN OPTICAL COMMUNICATIONS SYSTEMS

(75) Inventors: Michiko Takushima, Yokohama (JP); Tomomi Sano, Yokohama (JP); Osamu Shimakawa, Yokohama (JP); Tatsuhiko Tanaka, Yokohama (JP); Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 738 days.

(21) Appl. No.: 11/106,706

(22) Filed: Apr. 15, 2005

(65) Prior Publication Data

US 2005/0238285 A1    Oct. 27, 2005

Related U.S. Application Data

(60) Provisional application No. 60/562,607, filed on Apr. 16, 2004.

(30) Foreign Application Priority Data

Apr. 15, 2004    (JP)    ............................ P2004-120307

(51) Int. Cl.
*H01J 40/14* (2006.01)
(52) U.S. Cl. ................................. 250/214 R; 250/216

(58) Field of Classification Search ................. 250/216, 250/227.11, 227.14, 227.18, 227.23, 214 R; 356/73, 399–401; 359/566, 10, 11, 27; 385/24, 385/47, 147

See application file for complete search history.

(56) References Cited

U.S. PATENT DOCUMENTS 6,996,309 B2 *    2/2006    Ikeda et al. .................... 385/24

FOREIGN PATENT DOCUMENTS

JP    2002-303805    10/2002

* cited by examiner

*Primary Examiner*—Que T Le
(74) *Attorney, Agent, or Firm*—McDermott Will & Emery LLP

(57) ABSTRACT

The present invention relates to an optical signal processor which can perform favorable optical signal processing even when there are environmental changes and the like. The optical signal processor inputs light emitted from an end face of an optical fiber, subjects the inputted light to processing according to its wavelength, and outputs the processed light so as to make it incident on the end face of the optical fiber; and comprises optical systems, a diffraction grating device, mirror reflectors, an optical path turning part, and a monitor part. The optical path turning part transmits therethrough a part of the incident light and reflects at least a part of the remnant. The optical system monitors the light transmitted through the optical path turning part.

71 Claims, 15 Drawing Sheets

OPTICAL SIGNAL PROCESSOR AND OPTICAL SIGNAL PROCESSING METHOD FOR PROCESSING OPTICAL SIGNALS IN OPTICAL COMMUNICATIONS SYSTEMS

CROSS-REFERENCE TO RELATED APPLICATION

This application claims priority to Provisional Application Ser. No. 60/562,607 filed on Apr. 16, 2004, which is hereby incorporated by reference in its entirety.

BACKGROUND OF THE INVENTION

1. Field of the Invention

The present invention relates to an optical signal processor and an optical signal processing method which processes optical signals in optical communication systems.

2. Related Background Art

As an optical signal processor for processing optical signals in optical communication systems and the like, a dispersion compensator, disclosed in Japanese Patent Application Laid-Open No. 2002-303805, has been known, for example. The dispersion compensator disclosed in the document has a variable dispersion adjusting amount, and thus can compensate for dispersion optimally even when transmission paths of optical signals are altered. When a transmission path for an optical signal is altered in an optical network, the influence of dispersion upon the optical signal during the transmission varies. Even in such a case, optimal compensation can be effected if the dispersion adjusting amount in the dispersion compensator is changed in accordance with the cumulative chromatic dispersion of a new optical signal transmission path.

SUMMARY OF THE INVENTION

The inventors have studied conventional optical communication systems in detail, and as a result, have found problems as follows. Namely, the amount of processing of light in the optical signal processor mentioned above may change when its installed environment (e.g., temperature) varies. In such a case, the optical signal processor may fail to perform favorable optical signal processing.

In order to overcome the above-mentioned problems, it is an object of the present invention to provide an optical signal processor and an optical signal processing method which can perform optical signal processing even when there are environmental changes.

The optical signal processor according to the present invention is an optical signal processor for subjecting light fed into an input port to processing according to a wavelength of the light, and outputting the processed light from an output port. The optical signal processor according to the present invention, as a first aspect, comprises (1) a first optical system for receiving the light fed into the input port and outputting the received light; (2) a first wavelength branching device for inputting the light outputted by the first optical system, spatially splitting wavelength components included in the light, and outputting the split wavelength components to optical paths different from each other; (3) a second optical system for converging the wavelength components outputted from the first wavelength branching device; (4) a modulating part for spatially modulating an amplitude or phase of the wavelength components converged by the second optical system, and outputting the modulated wavelength components; (5) a third optical system for receiving the wavelength components outputted from the modulating part and outputting the received wavelength components; (6) a second wavelength branching device for inputting the wavelength components outputted from the third optical system, multiplexing the wavelength components, and outputting the multiplexed light; (7) optical path turning means for turning an optical path of the light outputted from the second wavelength branching device, so as to output the light from the output port by way of the second wavelength branching device, third optical system, modulating part, second optical system, first wavelength branching device, and first optical system in succession; and (8) a monitor part for taking out and receiving a part of the light directed from the second wavelength branching device to the optical path turning means, and monitoring the received light.

In the first aspect of the optical signal processor according to the present invention, the light fed into the input port is outputted by the first optical system, and then is spatially split in terms of wavelengths by the first wavelength branching device. The resulting wavelength components advance different optical paths depending on wavelengths, and then are converged by the second optical system. The wavelength components converged by the second optical system are spatially modulated in terms of amplitude or phase by the modulating part. Thus modulated wavelength components are outputted from the third optical system, and then are multiplexed by and outputted from the second wavelength branching device. The optical path of the light outputted from the second wavelength branching device after being multiplexed is turned by the optical path turning part, whereby the light passes an outbound path (an optical path from the optical path returning part to the output port) directed opposite from an inbound path (an optical path from the input port to the optical path turning part), so as to be outputted from the output port. A part of the light directed from the second wavelength branching device to the optical path turning means is monitored by the monitor part. In accordance with the monitoring result, the state of optical signal processing by the optical signal processor is obtained.

The optical signal processor according to the present invention, as a second aspect, comprises (1) a first optical system for receiving the light fed into the input port and outputting the received light; (2) a first wavelength branching device for inputting the light outputted by the first optical system, spatially splitting wavelength components included in the light, and outputting the split wavelength components to optical paths different from each other; (3) a second optical system for converging the wavelength components outputted from the first wavelength branching device; (4) a modulating part for spatially modulating an amplitude or phase of the wavelength components converged by the second optical system, and outputting the modulated wavelength components; (5) a third optical system for receiving the wavelength components outputted from the modulating part and outputting the received wavelength components; (6) a second wavelength branching device for inputting the wavelength components outputted from the third optical system, multiplexing the wavelength components, and outputting the multiplexed light; (7) a fourth optical system for guiding to the output port the light outputted from the second wavelength branching device; and (8) a monitor part for taking out and receiving a part of the light outputted from the second wavelength branching device, and monitoring the received light.

In the second aspect of the optical signal processor according to the present invention, the light fed into the input port is outputted by the first optical system, and then is spatially split in terms of wavelengths by the first wavelength branching device. The resulting wavelength components advance different optical paths depending on wavelengths and then are converged by the second optical system. The wavelength components converged by the second optical system are spatially modulated in terms of amplitude or phase by the modulating part. Thus modulated wavelength components are outputted from the third optical system, and then are multiplexed by and outputted from the second wavelength branching device. The light outputted from the second wavelength branching device after being multiplexed is guided to the output port by the fourth optical system, and then is outputted from the output port. A part of the light directed from the second wavelength branching device to the optical path turning means is monitored by the monitor part. According to the monitoring result, the state of optical signal processing by the optical signal processor is obtained.

The optical signal processor according to the present invention, as a third aspect, comprises (1) a first optical system for receiving the light fed into the input port and outputting the received light; (2) a first wavelength branching device for inputting the light outputted by the first optical system, spatially splitting wavelength components included in the light, and outputting the split wavelength components to optical paths different from each other; (3) a second optical system for converging the wavelength components outputted from the first wavelength branching device; (4) a modulating part for spatially modulating an amplitude or phase of the wavelength components converged by the second optical system, and outputting the modulated wavelength components; (5) a third optical system for receiving the wavelength components outputted from the modulating part and outputting the received wavelength components; (6) a second wavelength branching device for inputting the wavelength components outputted from the third optical system, multiplexing the wavelength components, and outputting the multiplexed light; (7) optical path turning means for turning an optical path of the light outputted from the second wavelength branching device, so as to output the light from the output port by way of the second wavelength branching device, third optical system, modulating part, second optical system, first wavelength branching device, and first optical system in succession; (8) a monitor light source part for making monitor light from the first optical system incident on the first wavelength branching device; and (10) a monitor part for receiving the monitor light having passed the first wavelength branching device, second optical system, modulating part, third optical system, and second wavelength branching device in succession after being outputted from the monitor light source part, and monitoring the received monitor light.

In the third aspect of the optical signal processor according to the present invention, the light fed into the input port is outputted by the first optical system, and then is spatially split in terms of wavelengths by the first wavelength branching device. The resulting wavelength components advance different optical paths depending on wavelengths and then are converged by the second optical system. The wavelength components converged by the second optical system are spatially modulated in terms of amplitude or phase by the modulating part. Thus modulated wavelength components are outputted from the third optical system, and then are multiplexed by and outputted from the second wavelength branching device. The optical path of the light outputted from the second wavelength branching device after being multiplexed is turned by the optical path turning part, whereby the light passes an outbound path (an optical path from the optical path returning part to the output port) directed opposite from an inbound path (an optical path from the input port to the optical path turning part), so as to be outputted from the output port. Monitor light outputted from the monitor light source part is made incident on the first wavelength branching device from the first optical system, passes the first wavelength branching device, second optical system, modulating part, third optical system, and second wavelength branching device in succession, and is monitored by the monitor part. According to the monitoring result, the state of optical signal processing by the optical signal processor is obtained.

The optical signal processor according to the present invention, as a fourth aspect, comprises (1) a first optical system for receiving the light fed into the input port and outputting the received light; (2) a first wavelength branching device for inputting the light outputted by the first optical system, spatially splitting wavelength components included in the light, and outputting the split wavelength components to optical paths different from each other; (3) a second optical system for converging the wavelength components outputted from the first wavelength branching device; (4) a modulating part for spatially modulating an amplitude or phase of the wavelength components converged by the second optical system, and outputting the modulated wavelength components; (5) a third optical system for receiving the wavelength components outputted from the modulating part and outputting the received wavelength components; (6) a second wavelength branching device for inputting the wavelength components outputted from the third optical system, multiplexing the wavelength components, and outputting the multiplexed light; (7) a fourth optical system for guiding to the output port the light outputted from the second wavelength branching device; (8) a monitor light source part for making monitor light from the first optical system incident on the first wavelength branching device; and (9) a monitor part for receiving the monitor light having passed the first wavelength branching device, second optical system, modulating part, third optical system, and second wavelength branching device in succession after being outputted from the monitor light source part, and monitoring the received monitor light.

In the fourth aspect of the optical signal processor according to the present invention, the light fed into the input port is outputted by the first optical system, and then is spatially split in terms of wavelengths by the first wavelength branching device. The resulting wavelength components advance different optical paths depending on wavelengths and then are converged by the second optical system. The wavelength components converged by the second optical system are spatially modulated in terms of amplitude or phase by the modulating part. Thus modulated wavelength components are outputted from the third optical system, and then are multiplexed by and outputted from the second wavelength branching device. The light outputted from the second wavelength branching device after being multiplexed is guided to the output port by the fourth optical system, and then is outputted from the output port. Monitor light outputted from the monitor light source part is made incident on the first wavelength branching device from the first optical system, passes the first wavelength branching device, second optical system, modulating part, third optical system, and second wavelength branching device in succession, and is monitored by the monitor part. In accordance with the monitoring result, the state of optical signal processing by the optical signal processor is obtained.

Preferably, in the first aspect of the optical signal processor according to the present invention, the optical path turning means transmits therethrough a part of the light outputted from the second wavelength branching device and reflects at least a part of the remnant so as to turn the optical path, whereas the monitor part monitors the light transmitted through the optical path turning means.

Preferably, in the first or second aspect of the optical signal processor according to the present invention, the monitor part includes a beam splitter for reflecting a part of the light outputted from the second wavelength branching device and transmitting therethrough at least a part of the remnant; and a monitoring part for monitoring the light reflected by the beam splitter.

Preferably, in any of the first to fourth aspects of the optical signal processor according to the present invention, at least one of the first and second wavelength branching devices includes a diffraction grating device.

Preferably, in any of the first to fourth aspects of the optical signal processor according to the present invention, the modulating part includes a reflecting surface. In this case, it will be preferred if the reflecting surface has a variable curvature or inclination, it will be preferred if the second and third optical systems are common with each other, and it will be preferred if the first and second wavelength branching devices are common with each other.

Preferably, in any of the first to fourth aspects of the optical signal processor according to the present invention, the monitor part includes a convergent optical system for converging the light to be monitored. In this case, it will be preferred if the convergent optical system has a focusable entrance pupil diameter smaller than the diameter of light outputted from the first optical system, it will be preferred if the monitor part includes an optical waveguide having an end face for receiving the light converged by the convergent optical system, whereas the optical waveguide guides the received light, and it will be preferred if the monitor part includes a plurality of sets of convergent optical systems and optical waveguides.

Preferably, in any of the first to fourth aspects of the optical signal processor according to the present invention, the monitor part monitors a spectrum of the received light or a power of a specific wavelength component in the received light. In this case, it will be preferred if the monitor part includes an optical filter for selectively transmitting therethrough a specific wavelength component in the received light, and a power detecting part for detecting the power of light transmitted through the optical filter, it will be preferred if the wavelength transmitted through the optical filter is variable, and it will be preferred if a plurality of wavelengths are transmitted through the optical filter.

Preferably, the first or second aspect of the optical signal processor according to the present invention further comprises a monitor light source part for outputting monitor light, and monitor light introducing means for inputting the monitor light outputted from the monitor light source part into the input port. In this case, it will be preferred if the monitor light source part is adapted to output monitor light having a wavelength different from a center wavelength of the light to be processed.

The optical signal processing method according to the present invention is a method for processing light by using any of the above-mentioned optical signal processors according to the present invention, the method comprising the step of controlling a spatial modulation of the amplitude or phase of the wavelength components according to a monitoring result by the monitor part, so as to adjust a processing state of the light outputted from the output port after being fed into the input port. Here, it will be preferred if the spatial modulation of the amplitude or phase of the wavelength components in the modulating part is feedforward-controlled according to the monitoring result by using a relationship between the monitoring result and processing state determined beforehand. It will also be preferred if the spatial modulation of the amplitude or phase of the wavelength components in the monitoring part is feedback-controlled according to the monitoring result such that the processing state attains a desirable value.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of an optical component, an optical device and an optical communications system according to the present invention will be explained in detail with reference to FIGS. 1 to 15. In the explanation of the drawings, constituents identical to each other will be referred to with numerals identical to each other without repeating their overlapping descriptions. For convenience of explanation, an xyz (xy'z') orthogonal coordinate system is shown in each drawing.

First Embodiment

Figure 1A:
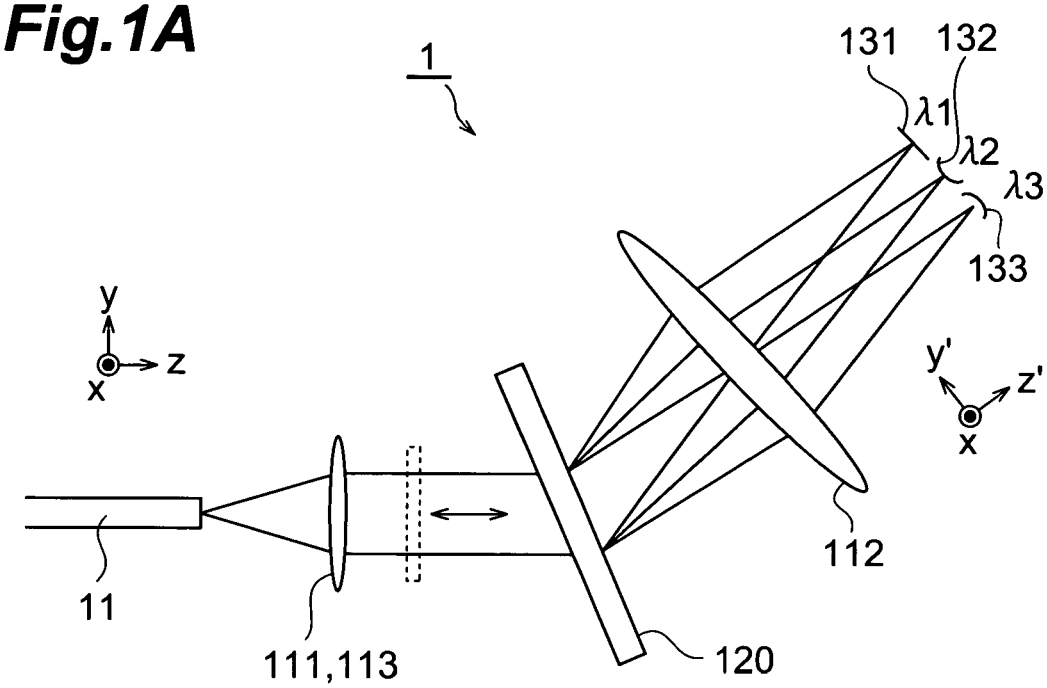
FIGS. 1A and 1B are diagrams showing a configuration of an optical signal processor of a first embodiment according to the present invention.
Figure 1B:
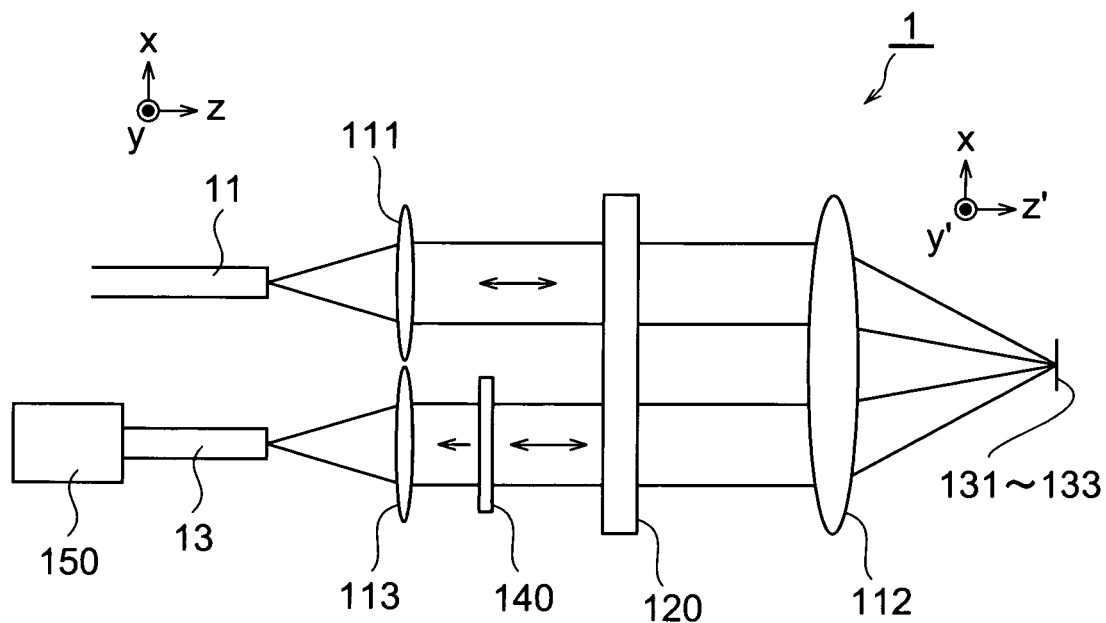

To begin with, the optical signal processor of a first embodiment according to the present invention will be explained. FIGS. 1A and 1B are diagrams showing a configuration of an optical signal processor 1 of the first embodiment according to the present invention. The optical signal processor 1 shown in this drawing is one which inputs light emitted from an end face of an optical fiber 11, subjects the inputted light to processing (dispersion adjustment) according to its wavelength, and outputs the processed light so as to make it incident on the end face of the optical fiber 11. The optical signal processor 1 comprises optical systems 111 to 113, a transmission type diffraction grating device 120, mirror reflectors 131 to 133, an optical path turning part 140, and a monitor part 150.

The xyz orthogonal coordinate system is set between the optical fibers 11, 13 and the diffraction grating device 120, whereas the z-axis is set parallel to the optical axis of the optical system 111. The xy'z' orthogonal optical system is set between the diffraction grating device 120 and the mirror reflectors 131 to 133, whereas the z'-axis is set parallel to the optical axis of the optical system 112. The x-axis is set parallel to directions in which the gratings in the diffraction grating device 120 extend.

FIG. 1A is a projected plan onto the yz- (y'z'-) plane. FIG. 1B is a projected plan onto the xz-plane between the optical fibers 11, 13 and the diffraction grating device 120, and a projected plan onto the xz'-plane between the diffraction grating device 120 and mirror reflectors 131 to 133.

The optical system 111 collimates the light incident thereon after being emitted from the end face of the optical fiber 11, and outputs thus collimated light. The light outputted from the optical system 111 after being collimated advances parallel to the z-axis.

The diffraction grating device 120 acts as a wavelength branching device, so as to input the light collimated by the optical system 111, spatially split wavelength components (three wavelengths $\lambda 1$ to $\lambda 3$ in this embodiment), and output thus split wavelength components to optical paths different from each other. The gratings of the diffraction grating device 120 extend along the x-axis, whereby the wavelength components outputted from the diffraction grating device 120 advance in respective directions which are parallel to the y'z'-plane and different from each other.

The optical system 112 converges the wavelength components outputted from the diffraction grating device 120. The wavelength components converged by and outputted from the optical system 112 are parallel to the xz'-plane, and advance while forming some angles with the z'-axis. The respective light-converging positions of the wavelength components align on a line parallel to the y'-axis.

The mirror reflectors 131 to 133 act as modulating parts for spatially modulating the amplitudes or phases of the wavelength components converged by the optical system 112 and outputting thus modulated wavelength components. The center of the reflecting surface of the mirror reflector 131 is located at the light-converging position of the wavelength component $\lambda 1$ converged by the optical system 112. The center of the reflecting surface of the mirror reflector 132 is located at the light-converging position of the wavelength component $\lambda 2$ converged by the optical system 112. The center of the reflecting surface of the mirror reflector 133 is located at the light-converging position of the wavelength component $\lambda 3$ converged by the optical system 112. In each of the mirror reflectors 131 to 133, the reflecting surface can freely be curved with respect to an axis parallel to the x-axis and has a variable curvature. The mirror reflectors 131 to 133 are manufactured by MEMS technology, for example. The respective wavelength components reflected by the mirror reflectors 131 to 133 are parallel to the xz'-plane, and advance while forming some angles with the z'-axis.

The optical system 112 inputs the respective wavelength components reflected by the mirror reflectors 131 to 133, collimates the wavelength components, and outputs thus collimated wavelength components. The wavelength components collimated by and outputted from the optical system 112 advance in respective directions which are parallel to the y'z'-plane and different from each other.

The diffraction grating device 120 inputs the wavelength components collimated by the optical system 112, multiplexes the wavelength components, and outputs thus multiplexed wavelength components to the same optical path. The wavelength components outputted from the diffraction grating device 120 advance in parallel with the z-axis.

The optical path turning part 140 turns the optical path of light outputted from the diffraction grating device 120, and outputs the light so as to make it incident on the end face of the optical fiber 11 by way of the diffraction grating device 120, optical system 112, mirror reflectors 131 to 133, and optical system 111 in succession. The optical path turning part 140 is an optical filter which has a reflectance of about 95% and a transmittance of about 5% at the wavelengths $\lambda 1$ to $\lambda 3$, for example, and is disposed parallel to the xy-plane.

general, the loss of signal light in the optical signal processor 1 is desired to be smaller, whereby it will be preferred if the reflectance of the optical path turning part 140 is higher. For monitoring by the monitor part 15, on the other hand, it will be unfavorable if the optical path turning part 140 has a higher reflectance. Therefore, it will be sufficient if the reflectance of the optical path turning part 140 is optimized in view of the relationship between an optical communication system using this optical signal processor 1 and the configuration of a monitor system including the monitor part 150.

Of the light having arrived by way of the inbound path to the optical path turning part 140 after being emitted from the end face of the optical fiber 11, the part reflected by the optical path turning part 140 is outputted by way of the outbound path directed opposite from the inbound path, so as to be made incident on the end face of the optical fiber 11. The wavelength components are reflected in each of the inbound and outbound paths by the mirror reflectors 131 to 133 whose curvatures are adjusted, whereby the chromatic dispersion is adjusted.

Of the light having arrived by way of the inbound path, the optical system 113 converges the part transmitted through the optical path turning part 140. The optical fiber 13 has an end face located at the light-converging position, inputs the converged light at the end face, and guides the light to the monitor part 150. The monitor part 150 receives the light guided by the optical fiber 13, and monitors thus received light.

Figure 2A:
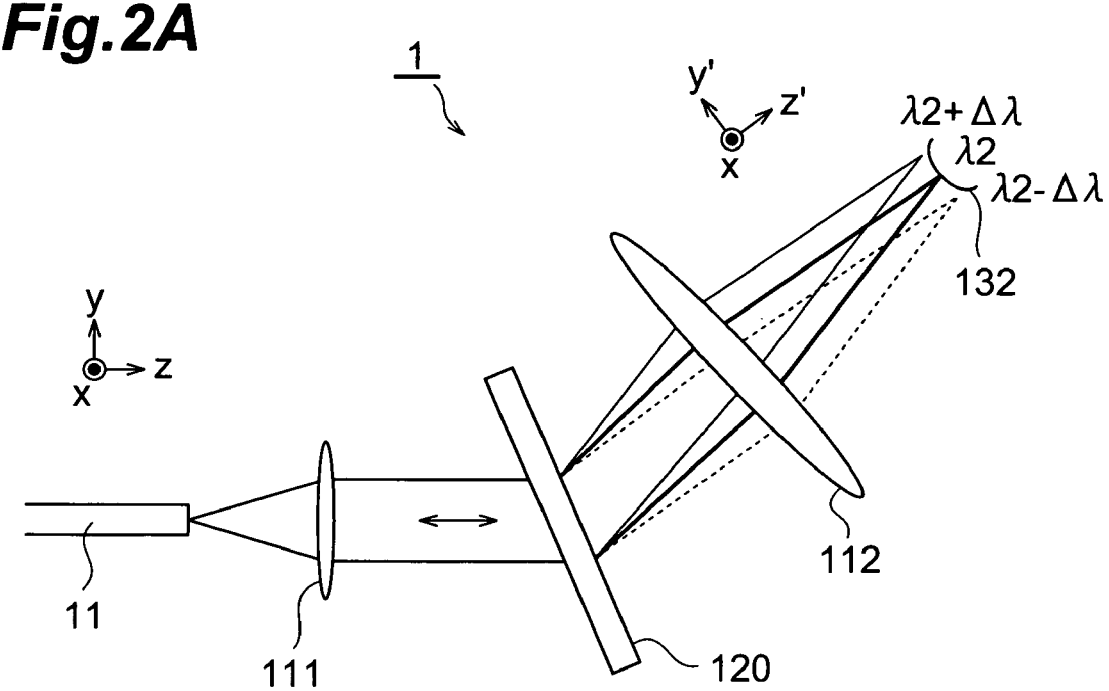
FIGS. 2A and 2B are views for explaining the principle of monitoring the amount of processing of the wavelength component $\lambda 2$ in the optical signal processor according to the first embodiment.
Figure 2B:
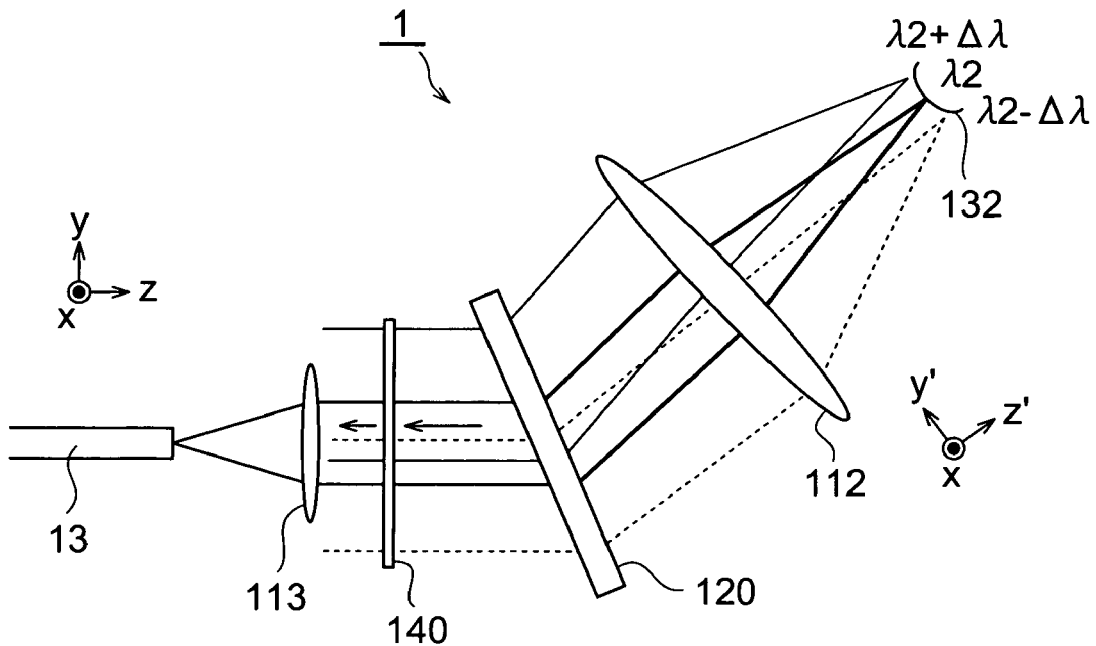

FIGS. 2A and 2B are views for explaining the principle of monitoring the amount of processing of the wavelength component $\lambda 2$ in the optical signal processor 1 according to the first embodiment. FIG. 2A, showing an optical path of the wavelength component $\lambda 2$ from the optical fiber 11 to the mirror reflector 132, is a projected plan onto the yz-plane between the optical fiber 11 and the diffraction grating device 120, and a projected plan onto the y'z'-plane between the diffraction grating device 120 and the mirror reflector 132. FIG. 2B, showing an optical path of the wavelength component $\lambda 2$ from the mirror reflector 120 to the optical fiber 13, is a projected plan onto the yz-plane between the optical fiber 13 and the diffraction grating device 120, and a projected plan onto the y'z'-plane between the diffraction grating device 120 and the mirror reflector 132.

The light reaching the mirror reflector 132 after being branched in terms of wavelength by the diffraction grating device 12 has a center wavelength of $\lambda 2$ but has a certain wavelength width thereabout. Therefore, in addition to the center wavelength component $\lambda 2$ (illustrated by broad solid lines in the drawings), a wavelength component $(\lambda 2+\Delta\lambda)$ (illustrated by thin solid lines in the drawings) and a wavelength component $(\lambda 2-\Delta\lambda)$ (illustrated by dotted lines in the drawings) are taken into consideration.

the center of the mirror reflector 132 on which the center wavelength component $\lambda 2$ is incident, the tangent plane of the reflecting surface is parallel to the xy'-plane, whereby the center wavelength component $\lambda 2$ is perpendicularly incident on the reflecting surface of the mirror reflector 132 when projected onto the y'z'-plane. Consequently, the optical path of the center wavelength component $\lambda 2$ from the mirror reflector 132 to the optical fiber 13 is shifted only along the x-axis from the optical path of the center wavelength component $\lambda 2$ from the optical fiber 11 to the mirror reflector 132.

When the reflecting surface of the mirror reflector 132 is curved, by contrast, the wavelength components $(\lambda 2\pm\Delta\lambda)$ are obliquely incident on the mirror reflector 132 when projected on the y'z'-plane. Consequently, the optical paths of the wavelength components $(\lambda 2\pm\Delta\lambda)$ from the mirror reflector 132 to the optical fiber 13 shift from the optical paths of the wavelength components $(\lambda 2\pm\Delta\lambda)$ from the optical fiber 11 to the mirror reflector 132 not only along the x-axis but also along the y or y'-axis.

Therefore, when the focusable entrance pupil diameter of the optical system 113 is smaller than the diameter of the light collimated by and outputted from the optical system 111, the extent to which the wavelength components $(\lambda 2\pm\Delta\lambda)$ are coupled to the optical fiber 13 depends not only on the difference $\Delta\lambda$ from the center wavelength $\lambda 2$ but also on the curvature of the reflecting surface of the mirror reflector 132.

Figure 3:
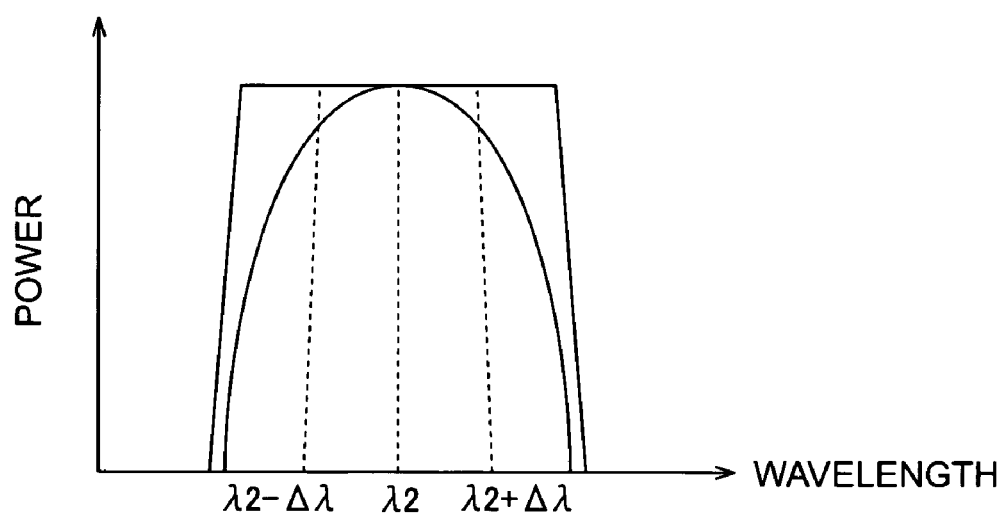
FIG. 3 is a chart showing the wavelength dependency of the power of light coupling with the optical fiber from the optical system in the optical signal processor according to the first embodiment.

FIG. 3 is a chart showing the wavelength dependency of the power of light coupling with the optical fiber 13 from the optical system 113 in the optical signal processor 1 according to the first embodiment. As shown in this chart, the center wavelength component $\lambda 2$ has the largest coupling power, whereas the coupling power becomes smaller as the difference $\Delta\lambda$ from the center wavelength $\lambda 2$ is greater.

Figure 4:
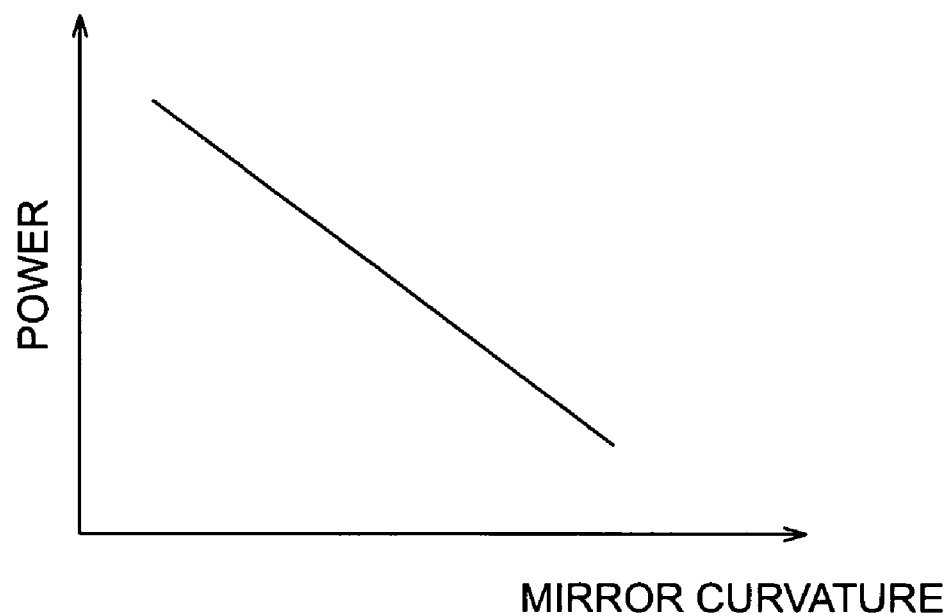
FIG. 4 is a chart showing the relationship between the power of the wavelength component ($\lambda 2+\Delta\lambda$) coupling with the optical fiber from the optical system in the optical signal processor according to the first embodiment and the curvature of the reflecting surface of the mirror reflector.

FIG. 4 is a chart showing the relationship between the power of the wavelength component $(\lambda 2+\Delta\lambda)$ coupling with the optical fiber 13 from the optical system 113 in the optical signal processor 1 according to the first embodiment and the curvature of the reflecting surface of the mirror reflector 132. As shown in this chart, the coupling power of the wavelength component $(\lambda 2+\Delta\lambda)$ has a certain correlation with respect to the curvature of the reflecting surface of the mirror reflector 132.

Hence, the monitor part 150 monitors the spectrum of the received light (FIG. 3) or the power of a specific wavelength component in the received light (FIG. 4). For monitoring the spectrum of light, an optical spectrum analyzer is used as the monitor part 150. For monitoring the power of a specific wavelength component, a combination of an optical filter selectively transmitting therethrough the specific wavelength component and a power detecting part for detecting the power of light transmitted through the optical fiber is used as the monitor part 150.

Therefore, the optical signal processor 1 according to the first embodiment obtains the respective curvatures of the reflecting surfaces of the mirror reflectors 131 to 133 (i.e., chromatic dispersion adjusting amounts of the wavelength components $\lambda 1$ to $\lambda 3$). The curvatures of the reflecting surfaces of the mirror reflectors 131 to 133 can be calculated from the characteristic of FIG. 3 or FIG. 4, or can be obtained according to the relationship between the monitoring result by the monitor part 150 and the curvatures of the reflecting surfaces of the mirror reflectors 131 to 133 determined beforehand. Feedforward or feedback control of the curvatures of the reflecting surfaces of the mirror reflectors 131 to 133 allows favorable optical signal processing (dispersion adjustment) even when there are environmental changes and the like.

When the combination of an optical fiber and a power detecting part is used as the monitor part 150 as mentioned above, it will be preferred if the wavelength transmitted through the optical filter is variable. In this case, it will be sufficient if wavelength components differing from the respective center wavelengths $\lambda 1$ to $\lambda 3$ by $\Delta\lambda$ are transmitted through the optical filter, and the power of thus transmitted light is detected by the power detecting part.

Figure 5:
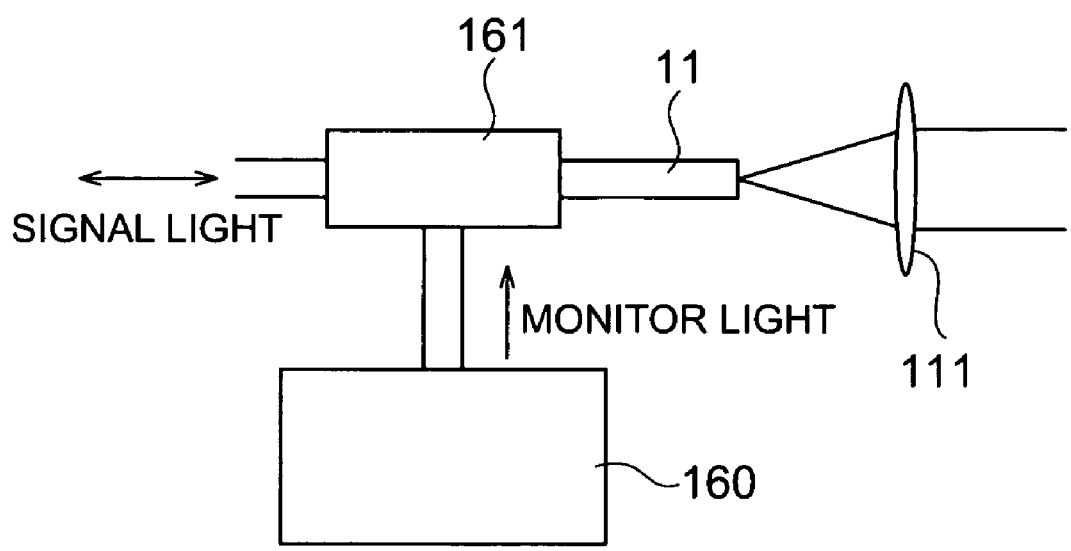
FIG. 5 is a partial diagram of a case where the optical signal processor according to the first embodiment is provided with the monitor light source part.

In general, signal light used in wavelength division multiplexing optical communications and the like has such a narrow bandwidth that wavelengths slightly shifted from the center wavelength may fail to yield a power sufficient for monitoring. In such a case, it will be preferred if a monitor light source part 160 for outputting monitor light, and a change-over switch 161 as monitor light introducing means for introducing the monitor light outputted from the monitor light source part 160 into the optical fiber 11 are provided as shown in FIG. 5.

The monitor light source part 160 outputs monitor light having a sufficient power in a wavelength range including the center wavelengths $\lambda 1$ to $\lambda 3$ of light to be processed by the optical signal processor 1. Alternatively, the monitor light source part 160 outputs respective monitor light wavelength components different by a certain value $\Delta\lambda$ from the center wavelengths $\lambda 1$ to $\lambda 3$. The change-over switch 161 selectively outputs from the end face of the optical fiber 11 one of the light to be processed by the optical signal processor 1 and the monitor light outputted from the monitor light source part 160, and feeds thus selected light into the optical system 111.

As the monitor light introducing means for introducing the monitor light outputted from the monitor light source part 160 into the optical fiber 11, an optical coupler may be used instead of the changing-over switch 161. When the optical coupler is used, both of the light to be processed by the optical signal processor 1 and the monitor light outputted from the monitor light source part 160 are outputted from the end face of the optical fiber 11 and fed into the optical system 111. Therefore, it will be sufficient if an optical filter is inserted at a given position on an optical path within the optical signal processor 1 (preferably at a given position in the outbound path), so as to eliminate the monitor light. Also, CW light may be used as the monitor light, or the monitor light may be modulated in terms of intensity with a frequency different from the intensity modulation frequency of the optical signal to be processed by the optical signal processor 1, so as to eliminate the monitor light component at the receiving end of the optical system by electric processing.

Second Embodiment

Figure 6A:
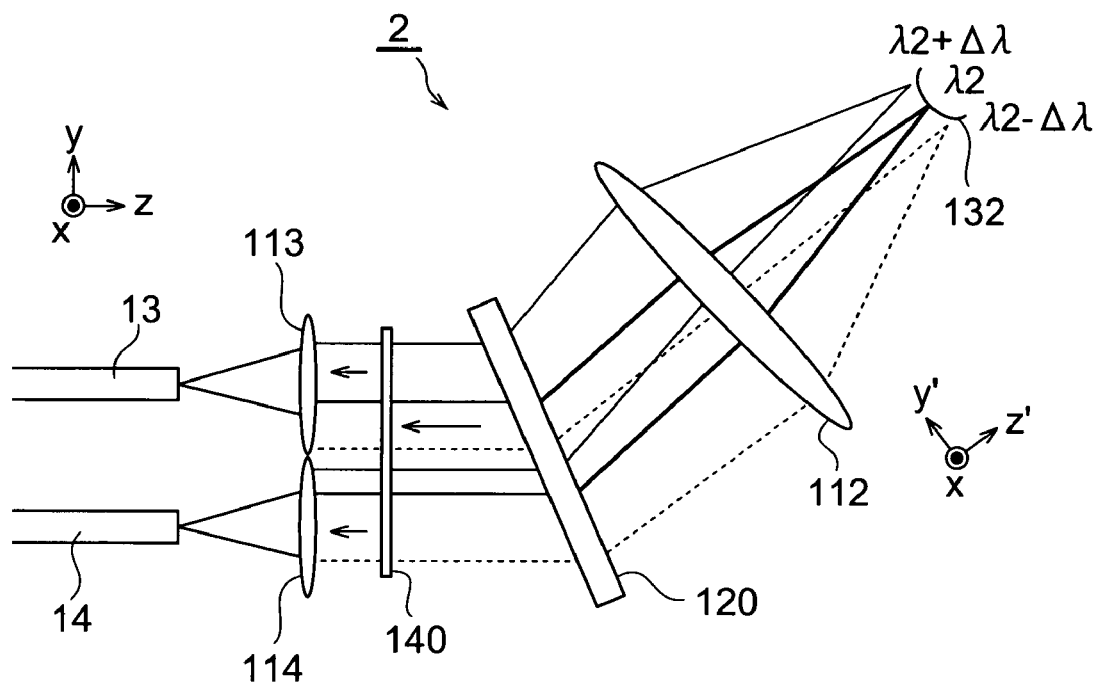
FIGS. 6A and 6B are views for explaining the principle of monitoring the amount of processing of the wavelength component $\lambda 2$ in an optical signal processor of a second embodiment according to the present invention.
Figure 6B:
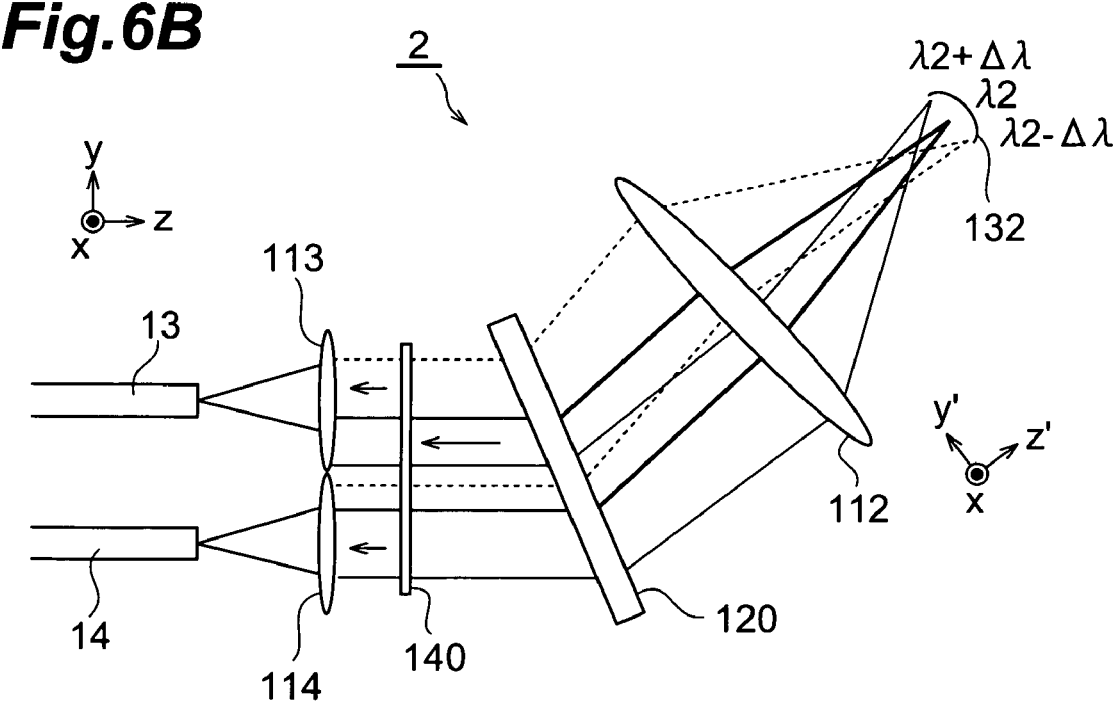

An optical signal processor of a second embodiment according to the present invention will now be explained. FIGS. 6A and 6B are views for explaining the principle of monitoring the amount of processing of the wavelength component $\lambda 2$ in the optical signal processor 2 according to the second embodiment. The optical signal processor 2 according to the second embodiment shown in FIGS. 6A and 6B differs from the optical signal processor 1 according to the above-mentioned first embodiment in that it further comprises an optical system 114 in addition to the optical system 113, and an optical fiber 14 in addition to the optical fiber 13, though these optical signal processors are the same in terms of the optical systems in the inbound and outbound paths between the optical fiber 11 and the optical path turning part 140.

Each of FIGS. 6A and 6B, showing the optical paths of the wavelength component $\lambda 2$ from the mirror reflector 132 to the optical fibers 13, 14, is a projected plan onto the yz-plane between the optical fibers 13, 14 and the mirror reflector 132, and a projected plan onto the y'z'-plane between the diffraction grating device 120 and the mirror reflector 132. The direction of curvature of the reflecting surface of the mirror reflector 132 differs between FIGS. 6A and 6B. These drawings show a wavelength component ($\lambda 2+\Delta\lambda$) (illustrated by thin solid lines in the drawings) and a wavelength component ($\lambda 2-\Delta\lambda$) (illustrated by dotted lines in the drawings) in addition to the center wavelength component $\lambda 2$ (illustrated by broad solid lines in the drawings).

The respective optical axes of the optical systems 113 and 114 are arranged symmetrical to each other about the center line of a luminous flux at the center wavelength $\lambda 2$. Of the light having arrived by way of the outbound path, each of the optical systems 113 and 114 converges the part transmitted through the optical path turning part 140. The optical fiber 13 has an end face located at the light-converging position due to the optical system 113, inputs the converged light at the end face, and guides the light to the monitor part. The optical fiber 14 has an end face located at the light-converging position due to the optical system 114, inputs the converged light at the end face, and guides the light to the monitor part. The monitor part receives the light guided by the optical fibers 13, 14, and monitors the spectrum of thus received light or the power of a specific wavelength component in the received light.

When the reflecting surface of the mirror reflector 132 has a convex form as shown in FIG. 6A, the wavelength component ($\lambda 2+\Delta\lambda$) reflected by the mirror reflector 132 couples more with the optical fiber 13 but less with the optical fiber 14. When the reflecting surface of the mirror reflector 132 has a concave form as shown in FIG. 6B, by contrast, the wavelength component ($\lambda 2+\Delta\lambda$) reflected by the mirror reflector 132 couples less with the optical fiber 13 but more with the optical fiber 14.

Figure 7A:
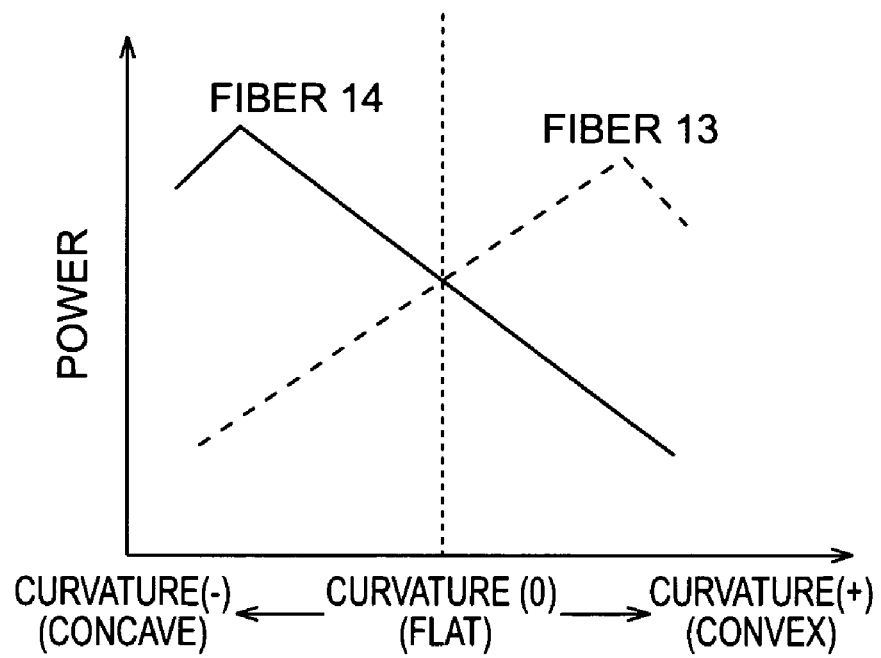
FIGS. 7A and 7B are charts showing the relationship between the power of wavelength components ($\lambda 2 \pm \Delta\lambda$) coupling with the optical fibers from the optical system and the curvature of the reflecting surface of the mirror reflector in the optical signal processor according to the second embodiment.
Figure 7B:
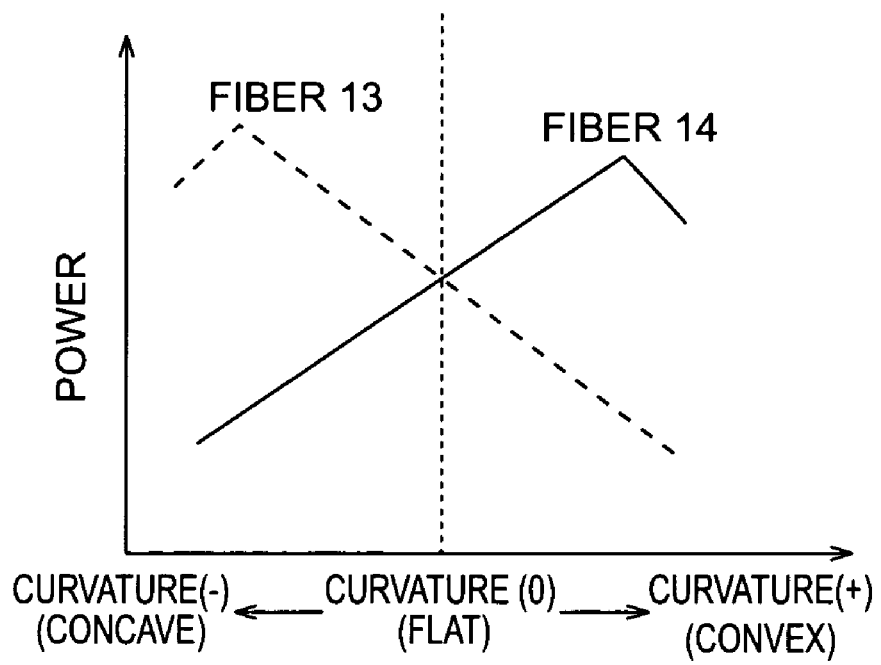

FIGS. 7A and 7B are charts showing the relationship between the power of wavelength components ($\lambda 2\pm\Delta\lambda$) coupling with the optical fibers 13, 14 from the optical system 113 and the curvature of the reflecting surface of the mirror reflector 132 in the optical signal processor 2 according to the second embodiment. FIG. 7A shows the relationship between the coupling power of the wavelength component ($\lambda 2+\Delta 80$ ) and the curvature of the reflecting surface of the mirror reflector 132, whereas FIG. 7B shows the relationship between the coupling power of the wavelength component ($\lambda 2-\Delta\lambda$) and the curvature of the reflecting surface of the mirror reflector 132. As shown in these charts, the power of wavelength components ($\lambda 2\pm\Delta\lambda$) coupling with the optical fibers 13, 14 from the optical system 113 has a constant correlation with respect to the curvature of the reflecting surface of the mirror reflector 132.

Therefore, when the power of wavelength components ($\lambda 2\pm\Delta\lambda$) coupling with the optical fibers 13, 14 from the optical system 113 is detected, the direction of curvature of the reflecting surface of the mirror reflector 132 can be seen. Here, it will be sufficient if only the power of the wavelength component ($\lambda 2+\Delta\lambda$) or ($\lambda 2-\Delta\lambda$) coupling with one optical fiber 13 from the optical system 113 is detected, or if only the power of the wavelength component ($\lambda 2+\Delta\lambda$) or ($\lambda 2-\Delta\lambda$) coupling with the other optical fiber 14 from the optical system 113 is detected. The direction of curvature of the reflecting surface of the mirror reflector 132 can be seen in these cases as well. The power of both of the wavelength components ($\lambda 2\pm\Delta\lambda$) coupling with one optical fibers 13 from the optical system 113, or the power of both of the wavelength components ($\lambda 2\pm\Delta\lambda$) coupling with the other optical fibers 14 from the optical system 113 may be detected. The spectrum of light coupling with the optical fibers 13, 14 from the optical system 113 may be monitored in this embodiment as well.

Therefore, the optical signal processor 2 according to the second embodiment can also obtain the respective curvatures of the reflecting surfaces of the mirror reflectors 131 to 133 (i.e., chromatic dispersion adjusting amounts of the wavelength components $\lambda 1$ to $\lambda 3$). The curvatures of the reflecting surfaces of the mirror reflectors 131 to 133 can be calculated from the characteristic of FIGS. 7A and 7B, or can be obtained according to the relationship between the monitoring result by the monitor part 150 and the curvatures of the reflecting surfaces of the mirror reflectors 131 to 133 determined beforehand. Feedforward or feedback control of the curvatures of the reflecting surfaces of the mirror reflectors 131 to 133 allows favorable optical signal processing (dispersion adjustment) even when there are environmental changes and the like.

Third Embodiment

Figure 8:
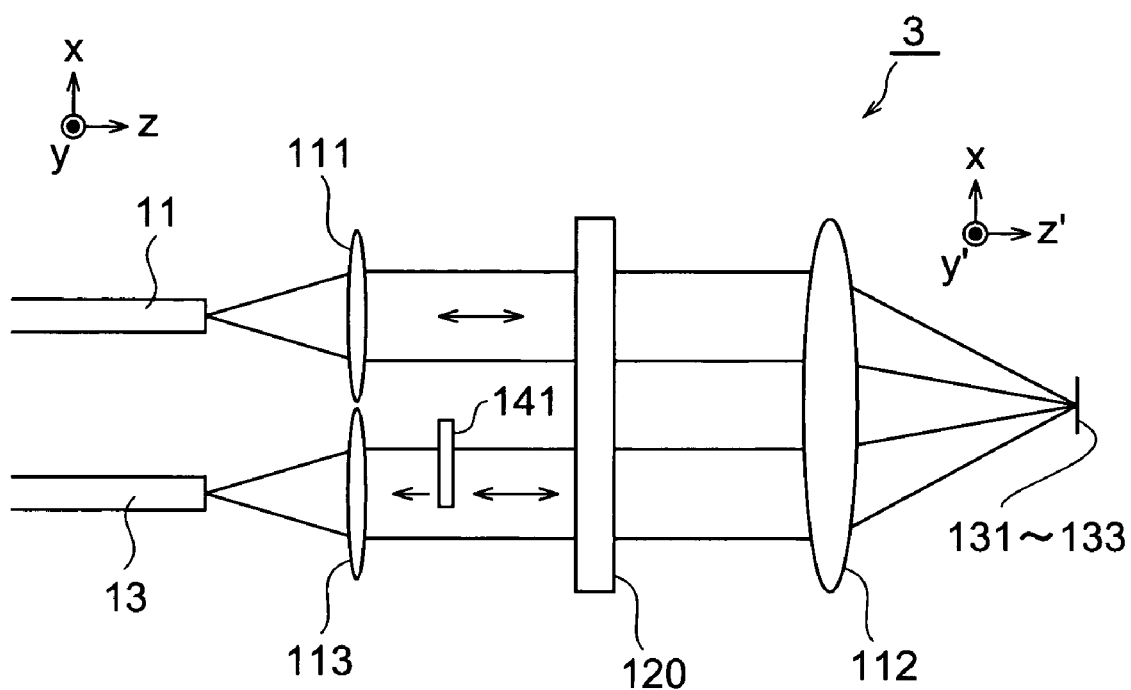
FIG. 8 is a diagram showing a configuration of an optical signal processor of a third embodiment according to the present invention.

An optical signal processor of a third embodiment according to the present invention will now be explained. FIG. 8 is a diagram showing a configuration of the optical signal processor 3 of the third embodiment according to the third embodiment. The optical signal processor 3 according to the third embodiment shown in FIG. 8 differs from the optical signal processor 1 according to the above-mentioned first embodiment in that it comprises an optical path turning part 141 instead of the optical path turning part 140, though these optical signal processors are the same in terms of the optical systems in the inbound and outbound paths between the optical fiber 11 and the immediate front of the optical path turning part 141 and in terms of the configurations of the optical path 113, optical fiber 13, and monitor part 150.

FIG. 8 is a projected plan onto the xz-plane between the optical fibers 11, 13 and the diffraction grating device 120, and a projected plan onto the xz'-plane between the diffraction grating device 120 and the mirror reflectors 131 to 133.

The optical path turning part 141 used in this embodiment is a mirror reflector having a reflectance of about 100%, and totally reflects a part of the transverse cross section of a luminous flux directed from the diffraction grating device 120 to the optical system 113, while transmitting therethrough at least a part of the remnant. Thus configured optical signal processor 3 according to the third embodiment operates as with the optical signal processor 1 according to the first embodiment, and can yield similar effects.

Fourth Embodiment

Figure 9A:
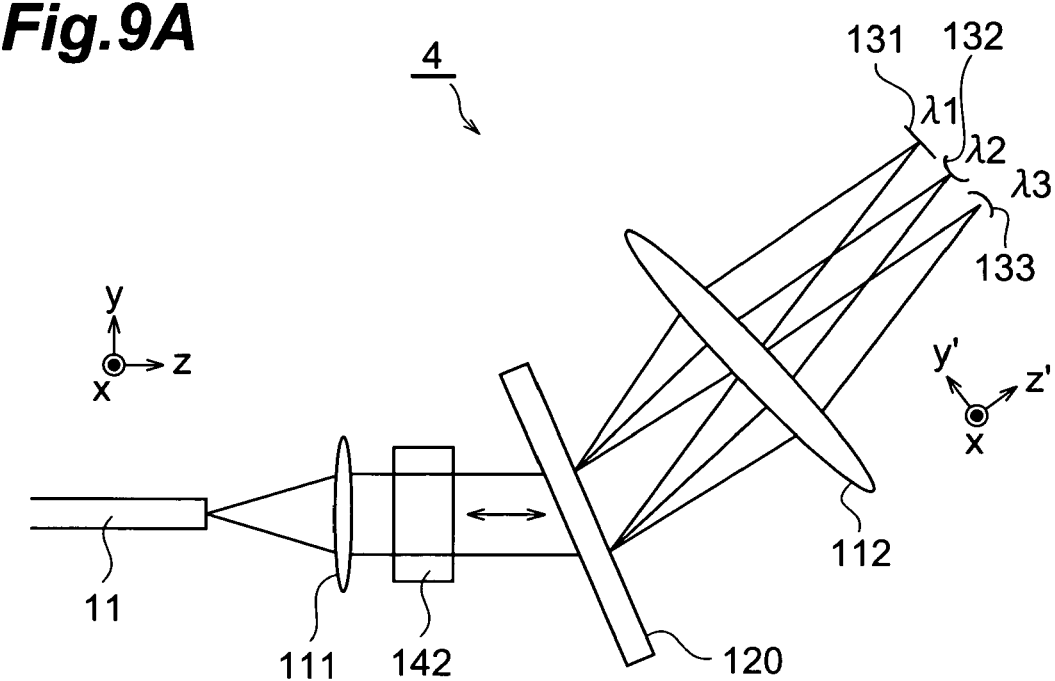
FIGS. 9A and 9B are diagrams showing a configuration of an optical signal processor of a fourth embodiment according to the present invention.
Figure 9B:
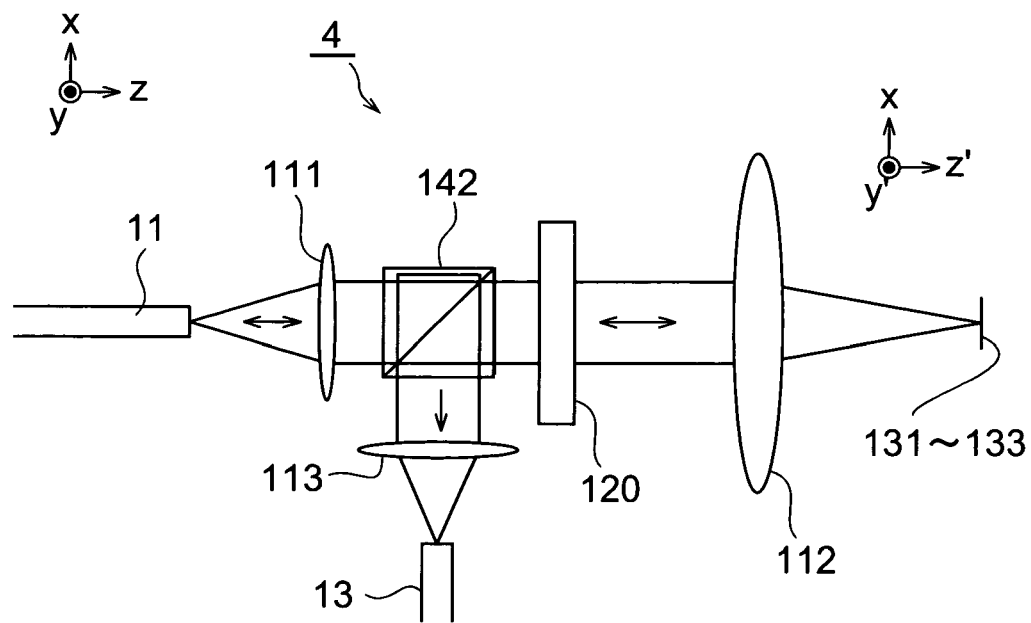

An optical signal processor of a fourth embodiment according to the present invention will now be explained. FIGS. 9A and 9B are diagrams showing a configuration of the optical signal processor 4 of the fourth embodiment according to the fourth embodiment. The optical signal processor 4 shown in FIGS. 9A and 9B is one which inputs light emitted from an end face of an optical fiber 11, subjects the inputted light to processing (dispersion adjustment) in accordance with to its wavelength, and outputs the processed light so as to make it incident on the end face of the optical fiber 11. The optical signal processor 4 comprises optical systems 111 to 113, a transmission type diffraction grating device 120, mirror reflectors 131 to 133, a beam splitter 142, and a monitor part.

An xyz orthogonal coordinate system is set between the optical fibers 11, 13 and the diffraction grating device 120, whereas the z-axis is set parallel to the optical axis of the optical system 111. An xy'z' orthogonal optical system is set between the diffraction grating device 120 and the mirror reflectors 131 to 133, whereas the z'-axis is set parallel to the optical axis of the optical system 112. The x-axis is set parallel to directions in which the gratings in the diffraction grating device 120 extend.

FIG. 9A is a projected plan onto the yz- (y'z'-) plane. FIG. 9B is a projected plan onto the xz-plane between the optical fibers 11, 13 and the diffraction grating device 120, and a projected plan onto the xz'-plane between the diffraction grating device 120 and mirror reflectors 131 to 133.

The optical system 111, diffraction grating device 120, and mirror reflectors 131 to 133 in the fourth embodiment are the same as those of the first embodiment.

The optical system 112 in the fourth embodiment converges the wavelength components outputted from the diffraction grating device 120. The light converged by and outputted from the optical system 112 advances parallel to the z'-axis. The respective light-converging positions of the wavelength components align on a line parallel to the y'-axis.

The mirror reflectors 131 to 133 act as modulating parts for spatially modulating the amplitudes or phases of the wavelength components converged by the optical system 112 and outputting thus modulated wavelength components. The center of the reflecting surface of the mirror reflector 131 is located at the light-converging position of the wavelength component λ1 converged by the optical system 112. The center of the reflecting surface of the mirror reflector 132 is located at the light-converging position of the wavelength component λ2 converged by the optical system 112. The center of the reflecting surface of the mirror reflector 133 is located at the light-converging position of the wavelength component λ3 converged by the optical system 112. In each of the mirror reflectors 131 to 133, the reflecting surface can freely be curved with respect to an axis parallel to the x-axis and has a variable curvature. The mirror reflectors 131 to 133 are manufactured by MEMS technology, for example. The respective wavelength components reflected by the mirror reflectors 131 to 133 advance parallel to the z'-axis.

The optical system 112 inputs the respective wavelength components reflected by the mirror reflectors 131 to 133, collimates the wavelength components, and outputs thus collimated wavelength components. The wavelength components collimated by and outputted from the optical system 112 advance in respective directions which are parallel to the y'z'-plane and different from each other.

The diffraction grating device 120 inputs the wavelength components collimated by the optical system 112, multiplexes the wavelength components, and outputs thus multiplexed wavelength components to the same optical path. The wavelength components outputted from the diffraction grating device 120 advance in parallel with the z-axis. The optical system 111 converges the light collimated and multiplexed by the diffraction grating device 120 onto the end face of the optical fiber 11, so as to make the light incident on the end face of the optical fiber 11.

The beam splitter 142 is disposed between the diffraction grating device 120 and the optical system 111. The beam splitter 142 reflects a part of the light directed from the diffraction grating device 120 to the optical system 111, and transmits therethrough at least a part of the remnant to the optical system 111. It will be sufficient if the reflectance of the beam splitter 142 is optimized in view of the relationship between an optical communication system using this optical signal processor 4 and the configuration of a monitor system including the monitor part.

The optical system 113 converges the light reflected by the beam splitter 142. The optical fiber 13 has an end face located at the light-converging position, inputs the converged light at the end face, and guides the light to the monitor part. The monitor part receives the light guided by the optical fiber 13, and monitors thus received light.

The fourth embodiment differs from the first to third embodiments in that light is reflected only once by any of the mirror reflectors 131 to 133 in the route from the input port to the output port. Thus configured optical signal processor 4 according to the fourth embodiment operates as with the optical signal processor 1 according to the first embodiment, and can yield similar effects.

In this optical signal processor 4, the beam splitter 142 can reflect a part of the light directed from the optical system 111 to the diffraction grating device 120, and transmit therethrough at least a part of the remnant to the diffraction grating device 120. Therefore, the optical signal processor 4 can monitor not only the light reflected by the mirror reflectors 131 to 133, but also the light before being reflected by the mirror reflectors 131 to 133, and thus can perform control according to the respective monitoring results obtained before and after the optical signal processing (dispersion adjustment).

Fifth Embodiment

Figure 10:
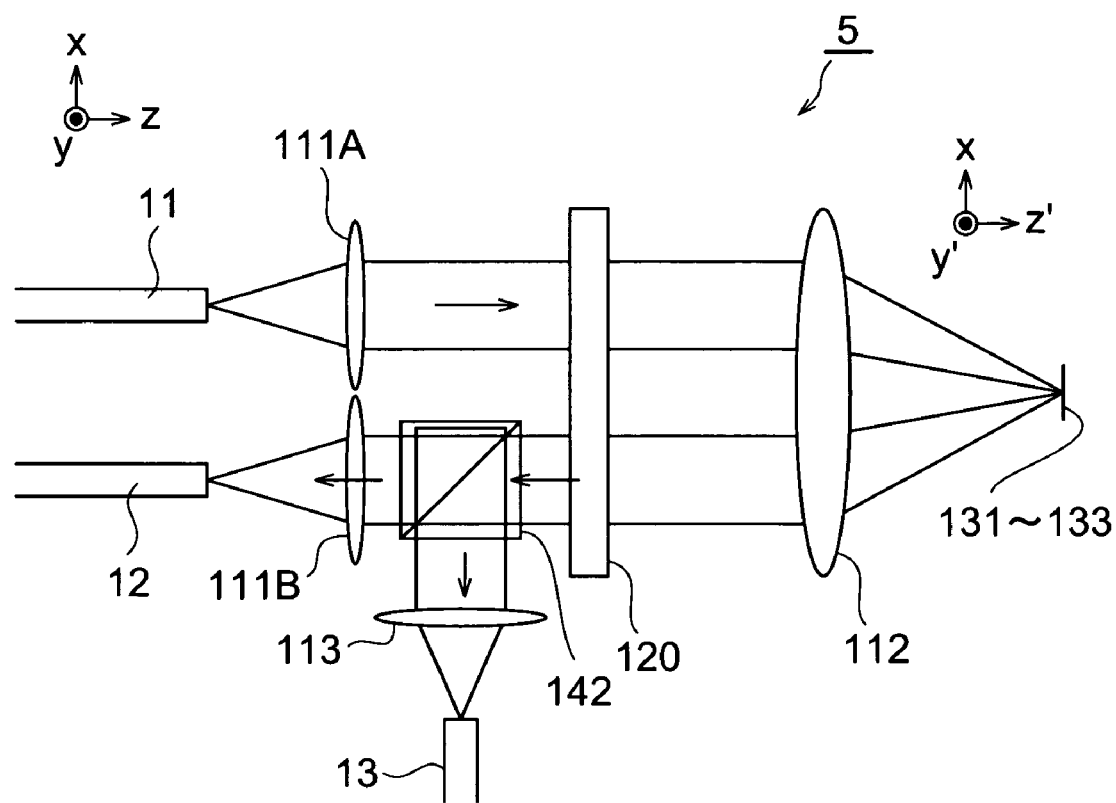
FIG. 10 is a diagram showing a configuration of an optical signal processor of a fifth embodiment according to the present invention.

An optical signal processor of a fifth embodiment according to the present invention will now be explained. FIG. 10 is a diagram showing a configuration of the optical signal processor 5 of the fifth embodiment according to the fifth embodiment. The optical signal processor 5 shown in this drawing is one which inputs light emitted from an end face of an optical fiber 11, subjects the inputted light to processing (dispersion adjustment) according to its wavelength, and outputs the processed light so as to make it incident on an end face of an optical fiber 12. The optical signal processor 5 comprises optical systems 111A, 11B, 112, 113, a transmission type diffraction grating device 120, mirror reflectors 131 to 133, a beam splitter 142, and a monitor part.

An xyz orthogonal coordinate system is set between the optical fibers 11 to 13 and the diffraction grating device 120, whereas the z-axis is set parallel to the optical axis of the optical system 111A. An xy'z' orthogonal optical system is set between the diffraction grating device 120 and the mirror reflectors 131 to 133, whereas the z'-axis is set parallel to the optical axis of the optical system 112. The x-axis is set parallel to directions in which the gratings in the diffraction grating device 120 extend.

This drawing is a projected plan onto the xz-plane between the optical fibers 11 to 13 and the diffraction grating device 120, and a projected plan onto the xz'-plane between the diffraction grating device 120 and mirror reflectors 131 to 133.

The optical system 111A, diffraction grating device 120, optical system 112, and mirror reflectors 131 to 133 in the fifth embodiment are the same as those in the first embodiment.

The beam splitter 142 and optical system 111B are disposed between the diffraction grating device 120 and the optical fiber 12. The beam splitter 142 reflects a part of the light directed from the diffraction grating device 120 to the optical fiber 12, and transmits therethrough at least a part of the remnant to the optical fiber 12. The optical system 111B converges the light transmitted through the beam splitter 142 onto the end face of the optical fiber 12.

The optical system 113 converges the light reflected by the beam splitter 142. The optical fiber 13 has an end face located at the light-converging position, inputs the converged light at the end face, and guides the light to the monitor part. The monitor part receives the light guided by the optical fiber 13, and monitors thus received light.

The fifth embodiment differs from the first to third embodiments in that the light is reflected only once by any of the mirror reflectors 131 to 133 in the route from the input port to the output port, and in that the optical fiber 11 for input and the optical fiber 12 for output are separated from each other. Thus configured optical signal processor 5 according to the fifth embodiment operates as with the optical signal processor 1 according to the first embodiment, and can yield similar effects.

Figure 11:
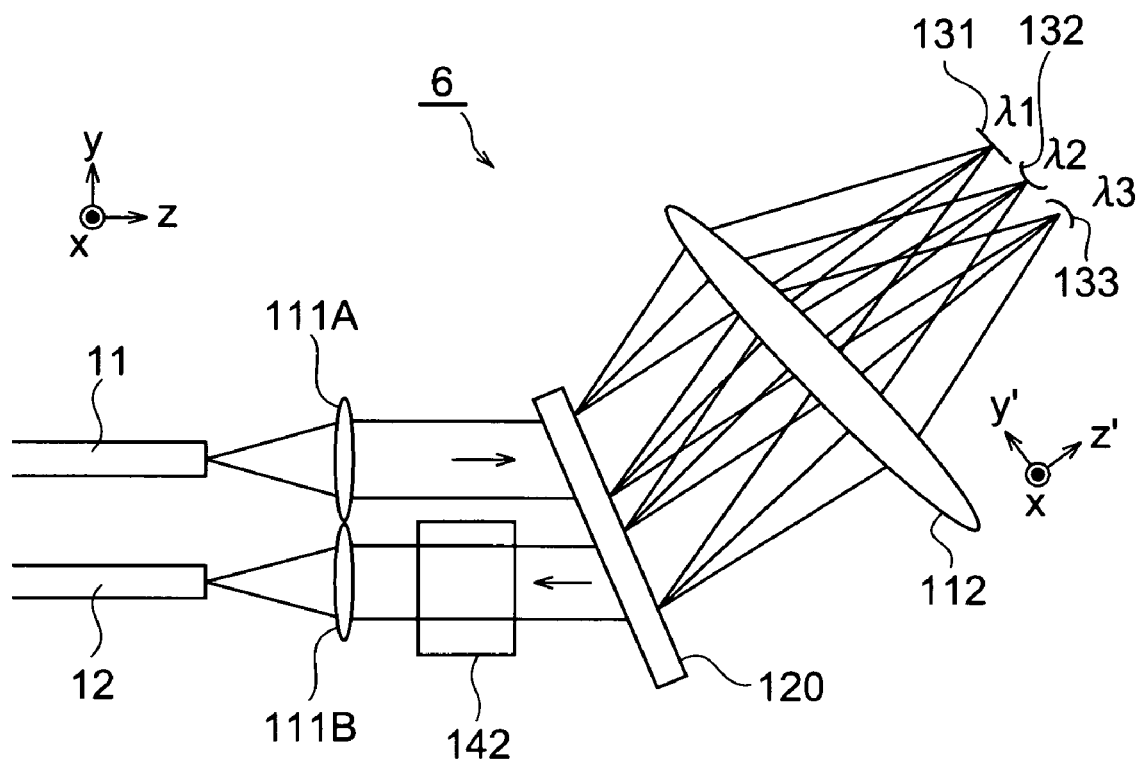
FIG. 11 is a diagram showing a configuration of an optical signal processor of a sixth embodiment according to the present invention.

Sixth Embodiment optical signal processor of a sixth embodiment according to the present invention will now be explained. FIG. 11 is a diagram showing a configuration of the optical signal processor 6 of the sixth embodiment according to the sixth embodiment. The optical signal processor 6 shown in this drawing is one which inputs light emitted from an end face of an optical fiber 11, subjects the inputted light to processing (dispersion adjustment) in accordance with its wavelength, and outputs the processed light so as to make it incident on an end face of an optical fiber 12. The optical signal processor 6 comprises optical systems 111A, 111B, 112, a transmission type diffraction grating device 120, mirror reflectors 131 to 133, a beam splitter 142, a monitor part, and a monitor optical system.

xyz orthogonal coordinate system is set between the optical fibers 11, 12 and the diffraction grating device 120, whereas the z-axis is set parallel to the optical axis of the optical system 111A. An xy'z' orthogonal optical system is set between the diffraction grating device 120 and the mirror reflectors 131 to 133, whereas the z'-axis is set parallel to the optical axis of the optical system 112. The x-axis is set parallel to directions in which the gratings in the diffraction grating device 120 extend. This drawing is a projected plan onto the yz- (y'z'-) plane.

The optical signal processor 6 according to the sixth embodiment differs from the optical signal processor 5 according to the fifth embodiment in that light advances on a plane parallel to the yz-plane until the light reaches the output port from the input port. Namely, the light advances on a plane parallel to the yz-plane between the optical system 112 and the mirror reflectors 131 to 133. However, the optical path of the light directed from the optical system 112 to the mirror reflectors 131 to 133 and the optical path of the light directed from the mirror reflectors 131 to 133 to the optical system 112 differ from each other.

The beam splitter 142 and optical system 111B are disposed between the diffraction grating device 120 and the optical fiber 12. The beam splitter 142 reflects a part of the light propagating in a direction from the diffraction grating device 120 to the optical fiber 12, and transmits therethrough at least a part of the remnant of the light toward the optical fiber 12. The optical system 111B converges the light transmitted through the beam splitter 142 onto the end face of the optical fiber 12.

The light reflected by the beam splitter 142 is converged by an optical system (not depicted), and then is guided by an optical fiber (not depicted), so as to be monitored by the monitor part (not depicted). Thus configured optical signal processor 6 according to the sixth embodiment operates as with the optical signal processor 5 according to the fifth embodiment, and can yield similar effects.

Seventh Embodiment

Figure 12:
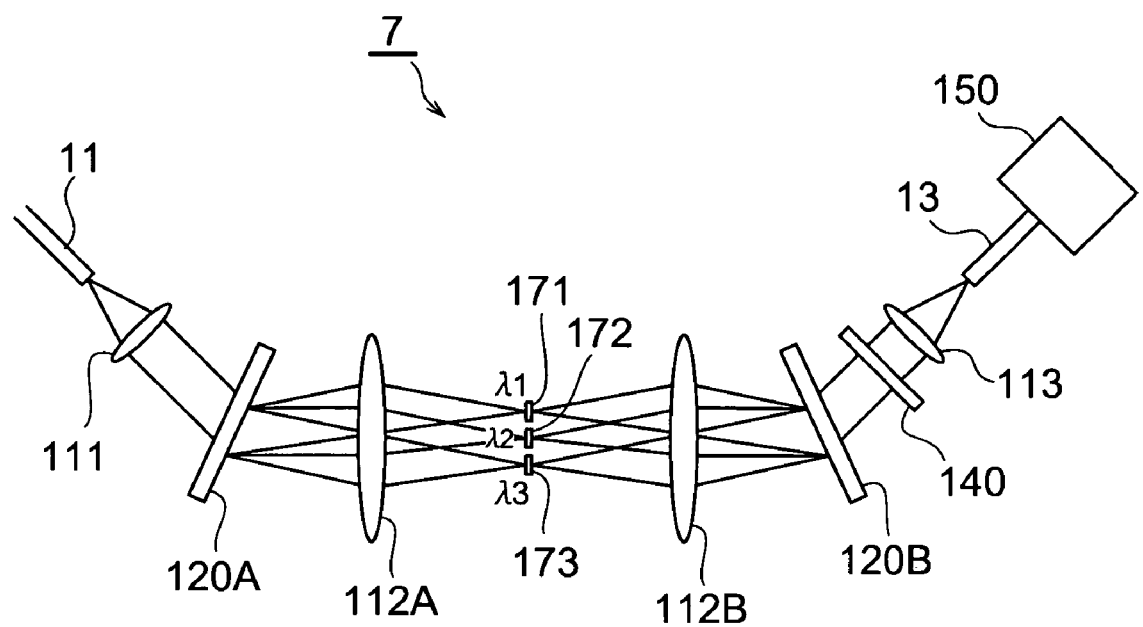
FIG. 12 is a diagram showing a configuration of an optical signal processor of a seventh embodiment according to the present invention.

An optical signal processor of a seventh embodiment according to the present invention will now be explained. FIG. 12 is a diagram showing a configuration of the optical signal processor 7 of the seventh embodiment according to the seventh embodiment. The optical signal processor 7 shown in this drawing is one which inputs light emitted from an end face of an optical fiber 11, subjects the inputted light to processing (dispersion adjustment) according to its wavelength, and outputs the processed light so as to make it incident on the end face of the optical fiber 11. The optical signal processor 7 comprises optical systems 111, 112A, 112B, 113, transmission type diffraction grating devices 120A, 120B, transmission type phase controlling devices 171 to 173, an optical path turning part 140, and a monitor part 150.

The optical system 111 collimates the light incident thereon after being emitted from the end face of the optical fiber 11, and outputs thus collimated light. The diffraction grating device 120A acts as a wavelength branching device, so as to input the light collimated by the optical system 111, spatially split wavelength components (three wavelengths $\lambda 1$ to $\lambda 3$ in this embodiment), and output thus split wavelength components to optical paths different from each other. The optical system 112A converges the wavelength components outputted from the diffraction grating device 120A.

The phase controlling devices 171 to 173 act as modulating parts for spatially modulating the phases of the wavelength components converged by the optical system 112A and outputting thus modulated wavelength components. The center of the phase controlling device 171 is located at the light-converging position of the wavelength component $\lambda 1$ converged by the optical system 112A. The center of the phase controlling device 172 is located at the light-converging position of the wavelength component $\lambda 2$ converged by the optical system 112A. The center of the phase controlling device 173 is located at the light-converging position of the wavelength component λ3 converged by the optical system 112A. Each of the phase controlling devices 171 to 173 is a liquid crystal display device, for example, and can modulate the transmitted light in terms of intensity with a variable degree of modulation.

The optical system 112B inputs the respective wavelength components transmitted through the phase controlling devices 171 to 173, collimates the wavelength components, and outputs thus collimated wavelength components. The diffraction grating device 120B inputs the wavelength components collimated by the optical system 112B, multiplexes the wavelength components, and outputs the multiplexed wavelength components to the same optical path. The optical path turning part 140 turns the optical path of light outputted from the diffraction grating device 120B, and outputs the light so as to make it incident on the end face of the optical fiber 11 by way of the diffraction grating device 120B, optical system 112B, phase controlling devices 171 to 173, optical system 112A, diffraction grating device 120A, and optical system 111 in succession. The optical path turning part 140 is an optical filter which has a reflectance of about 95% and a transmittance of about 5% at the wavelengths λ1 to λ3, for example, and is disposed parallel to the xy-plane.

Of the light having arrived by way of the inbound path to the optical path turning part 140 after being emitted from the end face of the optical fiber 11, the part reflected by the optical path turning part 140 is outputted by way of the outbound path directed opposite from the inbound path, so as to be made incident on the end face of the optical fiber 11. The phases of the wavelength components are adjusted in each of the inbound and outbound paths by the phase controlling devices 171 to 173, whereby the chromatic dispersion is adjusted.

Of the light having arrived by way of the inbound path, the optical system 113 converges the part transmitted through the optical path turning part 140. The optical fiber 13 has an end face located at the light-converging position, inputs the converged light at the end face, and guides the light to the monitor part 150. The monitor part 150 receives the light guided by the optical fiber 13, and monitors thus received light.

From the monitoring results obtained by the monitor part 150, the optical signal processor 7 according to the seventh embodiment can yield phase controlling amounts (i.e., chromatic dispersion adjusting amounts of the wavelength components λ1 to λ3) in the phase controlling devices 171 to 173. Feedforward or feedback control of the phase controlling amounts in the phase controlling devices 171 to 173 allows favorable optical signal processing (dispersion adjustment) even when there are environmental changes and the like.

Figure 13:
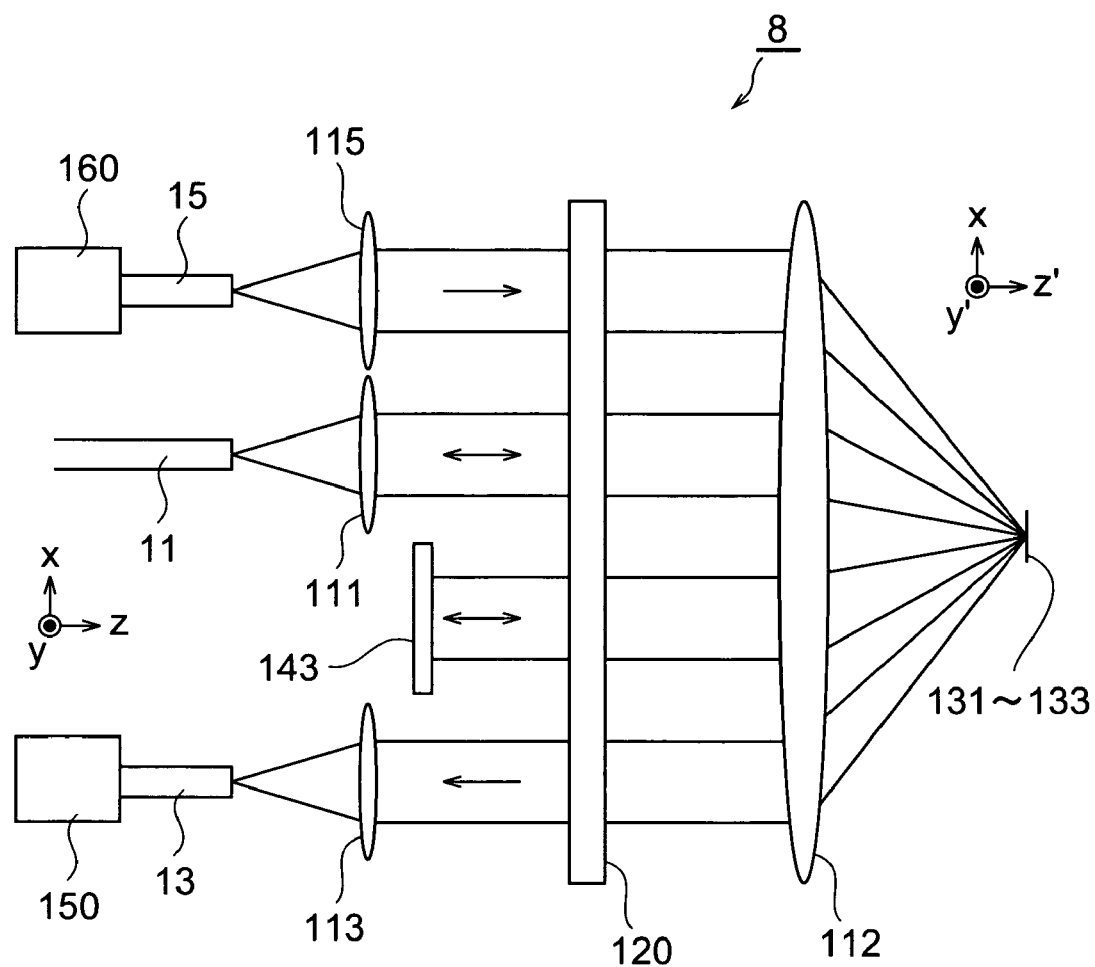
FIG. 13 is a diagram showing a configuration of an optical signal processor of an eighth embodiment according to the present invention.

Eighth Embodiment optical signal processor of an eighth embodiment according to the present invention will now be explained. FIG. 13 is a diagram showing a configuration of the optical signal processor 8 of the eighth embodiment according to the eighth embodiment. The optical signal processor 8 shown in this drawing is one which inputs light emitted from an end face of an optical fiber 11, subjects the inputted light to processing (dispersion adjustment) in accordance with its wavelength, and outputs the processed light so as to make it incident on the end face of the optical fiber 11. The optical signal processor 8 comprises optical systems 111 to 113, 115, a transmission type diffraction grating device 120, mirror reflectors 131 to 133, an optical path turning part 143, a monitor part 150, and a monitor light source part 160.

xyz orthogonal coordinate system is set between the optical fibers 11, 13 and the diffraction grating device 120, whereas the z-axis is set parallel to the optical axis of the optical system 111. An xy'z' orthogonal optical system is set between the diffraction grating device 120 and the mirror reflectors 131 to 133, whereas the z'-axis is set parallel to the optical axis of the optical system 112. The x-axis is set parallel to directions in which the gratings in the diffraction grating device 120 extend.

This drawing is a projected plan onto the xz-plane between the optical fibers 11, 13 and the diffraction grating device 120, and a projected plan onto the xz'-plane between the diffraction grating device 120 and the mirror reflectors 131 to 133.

The optical system 111 collimates the light incident thereon after being emitted from the end face of the optical fiber 11, and outputs thus collimated light. The light outputted from the optical system 111 after being collimated advances parallel to the z-axis.

The diffraction grating device 120 acts as a wavelength branching device, so as to input the light collimated by the optical system 111, spatially split wavelength components (three wavelengths λ1 to λ3 in this embodiment), and output thus split wavelength components to optical paths different from each other. The gratings of the diffraction grating device 120 extend along the x-axis, whereby the wavelength components outputted from the diffraction grating device 120 advance in respective directions which are parallel to the y'z'-plane and different from each other.

The optical system 112 converges the wavelength components outputted from the diffraction grating device 120. The wavelength components converged by and outputted from the optical system 112 are parallel to the xz'-plane, and advance while forming some angles with the z'-axis. The respective light-converging positions of the wavelength components align on a line parallel to the y'-axis.

The mirror reflectors 131 to 133 act as modulating parts for spatially modulating the amplitudes or phases of the wavelength components converged by the optical system 112 and outputting thus modulated wavelength components. The center of the reflecting surface of the mirror reflector 131 is located at the light-converging position of the wavelength component λ1 converged by the optical system 112. The center of the reflecting surface of the mirror reflector 132 is located at the light-converging position of the wavelength component λ2 converged by the optical system 112. The center of the reflecting surface of the mirror reflector 133 is located at the light-converging position of the wavelength component λ3 converged by the optical system 112. In each of the mirror reflectors 131 to 133, the reflecting surface can freely be curved with respect to an axis parallel to the x-axis and has a variable curvature. The mirror reflectors 131 to 133 are manufactured by MEMS technology, for example. The respective wavelength components reflected by the mirror reflectors 131 to 133 are parallel to the xz'-plane, and advance while forming some angles with the z'-axis.

The optical system 112 inputs the respective wavelength components reflected by the mirror reflectors 131 to 133, collimates the wavelength components, and outputs the collimated wavelength components. Here, the wavelength components collimated by and outputted from the optical system 112 advance in directions which are parallel to the y'z'-plane and different from each other.

The diffraction grating device 120 inputs the wavelength components collimated by the optical system 112, multiplexes the inputted wavelength components, and outputs thus multiplexed wavelength components to the same optical path.

The wavelength components outputted from the diffraction grating device 120 advance parallel to the z-axis.

The optical path turning part 143 turns the optical path of light outputted from the diffraction grating device 120, and outputs the light so as to make it incident on the end face of the optical fiber 11 by way of the diffraction grating device 120, optical system 112, mirror reflectors 131 to 133, optical system 112, diffraction grating device 120, and optical system 111 in succession. The optical path turning part 143 is an optical filter which has a reflectance of 100% at the wavelengths λ1 to λ3, thereby totally reflecting the light, and is disposed parallel to the xy-plane.

The light having arrived by way of the inbound path to the optical path turning part 143 after being emitted from the end face of the optical fiber 11 is reflected by the optical path turning part 143, and is outputted by way of the outbound path directed opposite from the inbound path, so as to be made incident on the end face of the optical fiber 11. The wavelength components are reflected in each of the inbound and outbound paths by the mirror reflectors 131 to 133 whose curvatures are adjusted, whereby the chromatic dispersion is adjusted.

The monitor light source part 160 outputs monitor light. An optical fiber 15 has one end receiving the monitor light outputted from the monitor light source part 160, guides the monitor light, and emits the monitor light from the other end. The optical system 115 inputs the monitor light emitted from the optical fiber 15, collimates the monitor light, and outputs thus collimated monitor light. The monitor light collimated by and outputted from the optical system 115 advances parallel to the z-axis, so as to be fed into the diffraction grating device 120, and then into the optical system 130 by way of the diffraction grating device 120, optical system 112, mirror reflectors 131 to 133, optical system 112, and diffraction grating device 120.

The optical system 113 converges the monitor light. The optical fiber 13 has an end face located at the light-converging position, inputs the converged monitor light at the end face, and guides the monitor light to the monitor part 150. The monitor part 150 receives the light guided by the optical fiber 13, and monitors thus received light.

Therefore, in the optical signal processor 8 according to the eighth embodiment, the monitor part 150 monitors the monitor light outputted from the monitor light source part 160, thereby attaining the respective curvatures of the reflecting surfaces of the mirror reflectors 131 to 133 (i.e., chromatic dispersion adjusting amounts of the wavelength components λ1 to λ3). Feedforward or feedback control of the curvatures of the reflecting surfaces of the mirror reflectors 131 to 133 allows favorable optical signal processing (dispersion adjustment) even when there are environmental changes and the like.

Figure 14:
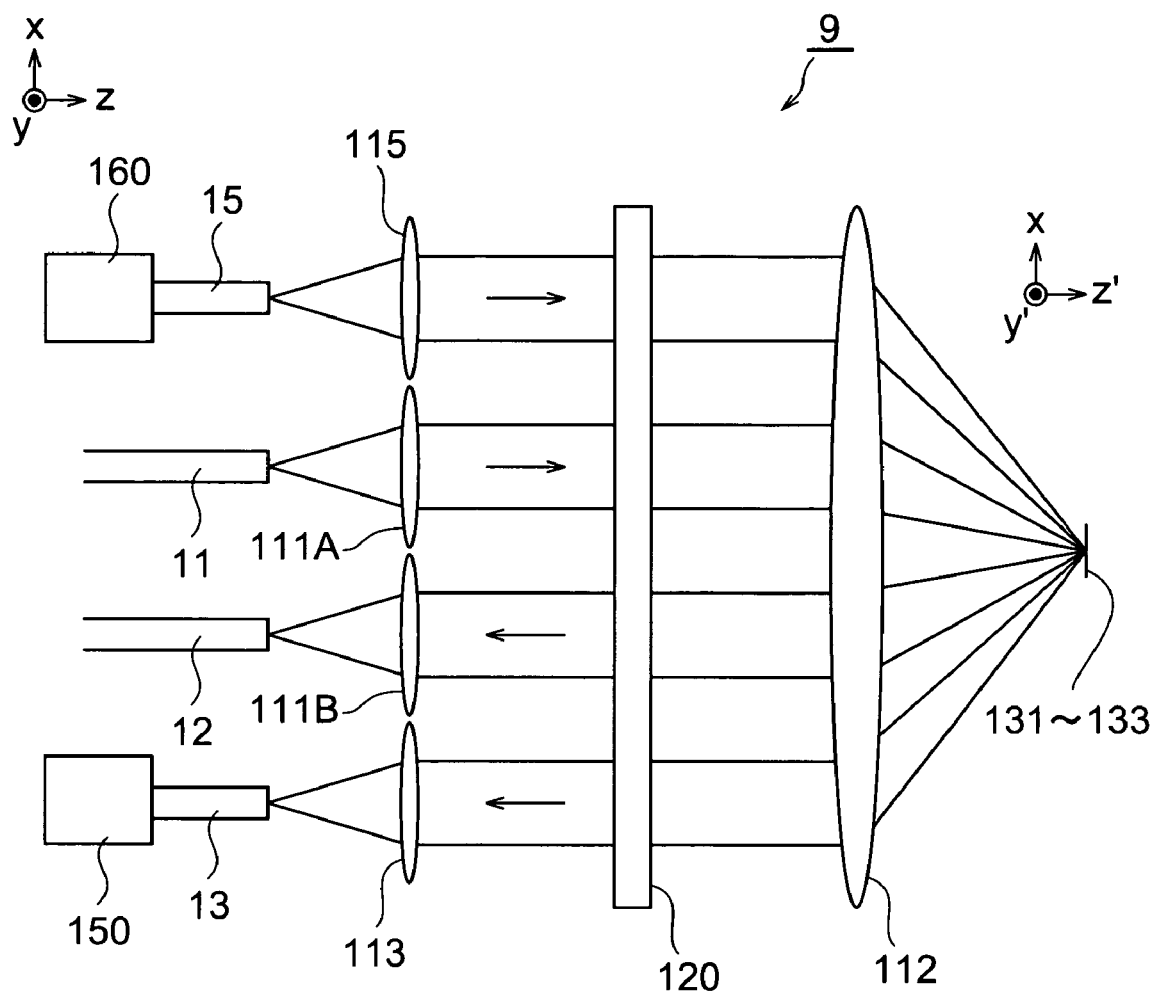
FIG. 14 is a diagram showing a configuration of an optical signal processor of a ninth embodiment according to the present invention.

Ninth Embodiment optical signal processor of a ninth embodiment according to the present invention will now be explained. FIG. 14 is a diagram showing a configuration of the optical signal processor 9 of the ninth embodiment according to the ninth embodiment. The optical signal processor 9 shown in this drawing is one which inputs light emitted from an end face of an optical fiber 11, subjects the inputted light to processing (dispersion adjustment) in accordance with its wavelength, and outputs the processed light so as to make it incident on an end face of an optical fiber 12. The optical signal processor 9 comprises optical systems 111A, 111B, 112, 113, 115, a transmission type diffraction grating device 120, mirror reflectors 131 to 133, a monitor part 150, and a monitor light source part 160.

An xyz orthogonal coordinate system is set between the optical fibers 11 to 13 and the diffraction grating device 120, whereas the z-axis is set parallel to the optical axis of the optical system 111A. An xy'z' orthogonal optical system is set between the diffraction grating device 120 and the mirror reflectors 131 to 133, whereas the z'-axis is set parallel to the optical axis of the optical system 112. The x-axis is set parallel to directions in which the gratings in the diffraction grating device 120 extend.

This drawing is a projected plan onto the xz-plane between the optical fibers 11, 13 and the diffraction grating device 120, and a projected plan onto the xz'-plane between the diffraction grating device 120 and the mirror reflectors 131 to 133.

The optical system 111A collimates the light incident thereon after being emitted from the end face of the optical fiber 11, and outputs thus collimated light. The light outputted from the optical system 111A after being collimated advances parallel to the z-axis.

The diffraction grating device 120 acts as a wavelength branching device, so as to input the light collimated by the optical system 111A, spatially split wavelength components (three wavelengths λ1 to λ3 in this embodiment), and output thus split wavelength components to optical paths different from each other. The gratings of the diffraction grating device 120 extend along the x-axis, whereby the wavelength components outputted from the diffraction grating device 120 advance in respective directions which are parallel to the y'z'-plane and different from each other.

The optical system 112 converges the wavelength components outputted from the diffraction grating device 120. The wavelength components converged by and outputted from the optical system 112 are parallel to the xz'-plane, and advance while forming some angles with the z'-axis. The respective light-converging positions of the wavelength components align on a line parallel to the y'-axis.

The mirror reflectors 131 to 133 act as modulating parts for spatially modulating the amplitudes or phases of the wavelength components converged by the optical system 112 and outputting thus modulated wavelength components. The center of the reflecting surface of the mirror reflector 131 is located at the light-converging position of the wavelength component λ1 converged by the optical system 112. The center of the reflecting surface of the mirror reflector 132 is located at the light-converging position of the wavelength component λ2 converged by the optical system 112. The center of the reflecting surface of the mirror reflector 133 is located at the light-converging position of the wavelength component λ3 converged by the optical system 112. In each of the mirror reflectors 131 to 133, the reflecting surface can freely be curved with respect to an axis parallel to the x-axis and has a variable curvature. The mirror reflectors 131 to 133 are manufactured by MEMS technology, for example. The respective wavelength components reflected by the mirror reflectors 131 to 133 are parallel to the xz'-plane, and advance while forming some angles with the z'-axis.

The optical system 112 inputs the respective wavelength components reflected by the mirror reflectors 131 to 133, collimates the wavelength components, and outputs the collimated wavelength components. Here, the wavelength components collimated by and outputted from the optical system 112 advance in directions which are parallel to the y'z'-plane and different from each other.

The diffraction grating device 120 inputs the wavelength components collimated by the optical system 112, multiplexes the inputted wavelength components, and outputs thus multiplexed wavelength components to the same optical path. The wavelength components outputted from the diffraction grating device 120 advance parallel to the z-axis.

The optical system 111B converges the light outputted from the diffraction grating device 120 onto an end face of an optical fiber 12. The wavelength components having reached the end face of the optical fiber 12 after being emitted from the end face of the optical fiber 11 are reflected by the mirror reflectors 131 to 133 whose curvatures are adjusted, whereby the chromatic dispersion is adjusted.

The monitor light source part 160 outputs monitor light. An optical fiber 15 has one end receiving the monitor light outputted from the monitor light source part 160, guides the monitor light, and emits the monitor light from the other end. The optical system 115 inputs the monitor light emitted from the optical fiber 15, collimates the monitor light, and outputs thus collimated monitor light. The monitor light collimated by and outputted from the optical system 115 advances parallel to the z-axis, so as to be fed into the diffraction grating device 120, and then into the optical system 130 by way of the diffraction grating device 120, optical system 112, mirror reflectors 131 to 133, optical system 112, and diffraction grating device 120.

The optical system 113 converges the monitor light. The optical fiber 13 has an end face located at the light-converging position, inputs the converged monitor light at the end face, and guides the monitor light to the monitor part 150. The monitor part 150 receives the light guided by the optical fiber 13, and monitors thus received light.

Therefore, in the optical signal processor 9 according to the ninth embodiment, the monitor part 150 monitors the monitor light outputted from the monitor light source part 160, thereby attaining the respective curvatures of the reflecting surfaces of the mirror reflectors 131 to 133 (i.e., chromatic dispersion adjusting amounts of the wavelength components λ1 to λ3). Feedforward or feedback control of the curvatures of the reflecting surfaces of the mirror reflectors 131 to 133 allows favorable optical signal processing (dispersion adjustment) even when there are environmental changes and the like.

MODIFIED EXAMPLE

Without being restricted to the above-mentioned embodiments, the present invention can be modified in various manners. For example, a plurality of wavelength components may be monitored in each of the embodiments as in the second embodiment. Planar optical waveguides formed on a substrate may be used in place of the optical fibers 11 to 14. Reflection type diffraction grating devices may be used in place of the transmission type diffraction grating devices. Though the above-mentioned embodiments relate to cases where the optical signal processor is a dispersion compensator, the present invention is not limited thereto.

Figure 15:
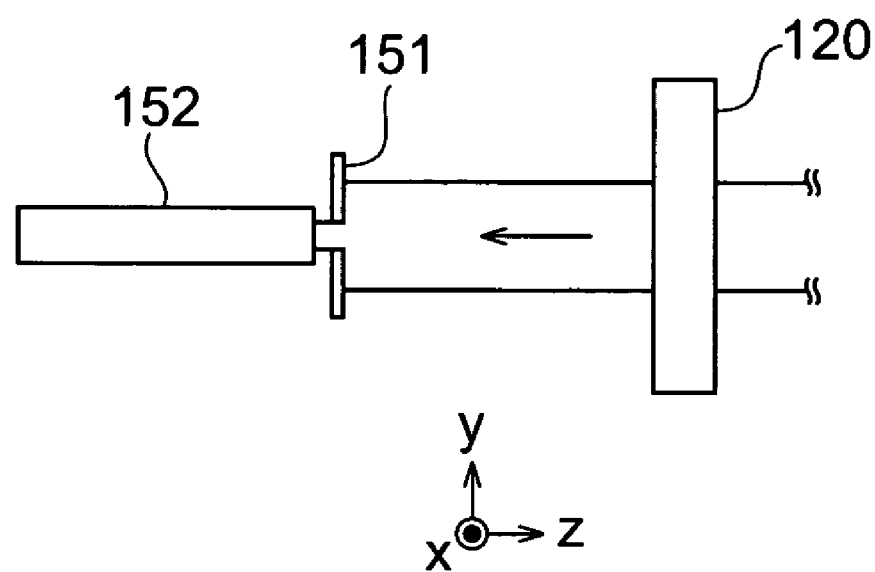
FIG. 15 is a view showing another configurational example of the monitor part.

Instead of the optical system 113, optical fiber 13, and monitor part 150, a monitor part comprising a mask 151 having an opening and a power detecting part 152 for detecting the power of light passed through the opening as shown in FIG. 15 may be used. Preferably, in this case, the monitor light has a monochromatic wavelength.

The present invention can perform favorable optical signal processing even when there are environmental changes and the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical signal processor for subjecting light to processing according to a wavelength of the light, and outputting the processed light, said optical signal processor comprising:
an input port for taking out the light to be processed;
an output port for outputting the processed light;
a first optical system for receiving the light fed into said input port and outputting the received light;
a first wavelength branching device for inputting the light outputted from said first optical system, spatially splitting wavelength components included in the light, and outputting the split wavelength components to optical paths different from each other;
a second optical system for converging the wavelength components outputted from said first wavelength branching device;
a modulating part for spatially modulating an amplitude or phase of the wavelength components converged by said second optical system, and outputting the modulated wavelength components;
a third optical system for receiving the wavelength components outputted from said modulating part and outputting the received wavelength components;
a second wavelength branching device for inputting the wavelength components outputted from said third optical system, multiplexing the wavelength components, and outputting the multiplexed light;
optical path turning means for turning an optical path of the light outputted from said second wavelength branching device, so as to output the light from said output port by way of said second wavelength branching device, said third optical system, said modulating part, said second optical system, said first wavelength branching device, and said first optical system in succession; and
a monitor part disposed at a position different from positions where said input port and said output port are disposed, said monitor part monitoring, after receiving a part of the light directed from said second wavelength branching device to said optical path turning means, a spectrum of the received light or a power of a specific wavelength component in the received light.

2. An optical signal processor according to claim 1, wherein said optical path turning means transmits therethrough a part of the light outputted from said second wavelength branching device and reflects at least a part of the remnant so as to turn the optical path; and
wherein said monitor part monitors the light transmitted through said optical path turning means.

3. An optical signal processor according to claim 1, wherein said monitor part includes:
a beam splitter for reflecting a part of the light outputted from said second wavelength branching device and transmitting therethrough at least a part of the remnant; and
a monitoring part for monitoring the light reflected by said beam splitter.

4. An optical signal processor according to claim 1, wherein at least one of said first and second wavelength branching devices includes a diffraction grating device.

5. An optical signal processor according to claim 1, wherein said modulating part includes a reflecting surface.

6. An optical signal processor according to claim 5, wherein the reflecting surface has a variable curvature or inclination.

7. An optical signal processor according to claim 5, wherein said second and third optical systems are common with each other.

8. An optical signal processor according to claim 5, wherein said first and second wavelength branching devices are common with each other.

9. An optical signal processor according to claim 1, wherein said monitor part includes a convergent optical system for converging the light to be monitored.

10. An optical signal processor according to claim 9, wherein said convergent optical system has a focusable entrance pupil diameter smaller than the diameter of light outputted from said first optical system.

11. An optical signal processor according to claim 9, wherein said monitor part includes an optical waveguide having an end face for receiving the light converged by said convergent optical system, said optical waveguide guiding the received light.

12. An optical signal processor according to claim 11, wherein said monitor part includes a plurality of sets of convergent optical systems and optical waveguides.

13. An optical signal processor according to claim 1, wherein said monitor part includes:
an optical filter for selectively transmitting therethrough a specific wavelength component in the received light; and
a power detecting part for detecting the power of light transmitted through said optical filter.

14. An optical signal processor according to claim 13, wherein the wavelength transmitted through said optical filter is variable.

15. An optical signal processor according to claim 14, wherein a plurality of wavelengths are transmitted through said optical filter.

16. An optical signal processor according to claim 1, further comprising:
a monitor light source part for outputting monitor light; and
monitor light introducing means for inputting the monitor light outputted from said monitor light source part into said input port.

17. An optical signal processor according to claim 16, wherein said monitor light source part is adapted to output monitor light having a wavelength different from a center wavelength of the light to be processed.

18. An optical signal processing method of processing light by using an optical signal processor according to claim 1, said method comprising the step of controlling a spatial modulation of the amplitude or phase of the wavelength components in accordance with a monitoring result by said monitor part, so as to adjust a processing state of the light outputted from said output port after being fed into said input port.

19. An optical signal processing method according to claim 18, wherein the spatial modulation of the amplitude or phase of the wavelength components in said modulating part is feedforward-controlled in accordance with the monitoring result by using a relationship between the monitoring result and processing state determined beforehand.

20. An optical signal processing method according to claim 19, wherein the spatial modulation of the amplitude or phase of the wavelength components in said monitoring part is feedback-controlled in accordance with the monitoring result such that the processing state attains a desirable value.

21. An optical signal processor for subjecting light to processing according to a wavelength of the light, and outputting the processed light, said optical signal processor comprising:
an input port for taking out the light to be processed;
an output port for outputting the processed light;
a first optical system for receiving the light fed into said input port and outputting the received light;
a first wavelength branching device for inputting the light outputted from said first optical system, spatially splitting wavelength components included in the light, and outputting the split wavelength components to optical paths different from each other;
a second optical system for converging the wavelength components outputted from said first wavelength branching device;
a modulating part for spatially modulating an amplitude or phase of the wavelength components converged by said second optical system, and outputting the modulated wavelength components;
a third optical system for receiving the wavelength components outputted from said modulating part and outputting the received wavelength components;
a second wavelength branching device for inputting the wavelength components outputted from said third optical system, multiplexing the wavelength components, and outputting the multiplexed light;
a fourth optical system for guiding to said output port the light outputted from said second wavelength branching device; and
a monitor part disposed at a position different from positions where said input port and said output port are disposed, said monitor part monitoring, after receiving a part of the light outputted from said second wavelength branching device, a spectrum of the received light or a power of a specific wavelength component in the received light.

22. An optical signal processor according to claim 21, wherein said monitor part includes:
a beam splitter for reflecting a part of the light outputted from said second wavelength branching device and transmitting therethrough at least a part of the remnant; and
a monitoring part for monitoring the light reflected by said beam splitter.

23. An optical signal processor according to claim 21, wherein at least one of said first and second wavelength branching devices includes a diffraction grating device.

24. An optical signal processor according to claim 21, wherein said modulating part includes a reflecting surface.

25. An optical signal processor according to claim 24, wherein the reflecting surface has a variable curvature or inclination.

26. An optical signal processor according to claim 24, wherein said second and third optical systems are common with each other.

27. An optical signal processor according to claim 24, wherein said first and second wavelength branching devices are common with each other.

28. An optical signal processor according to claim 21, wherein said monitor part includes a convergent optical system for converging the light to be monitored.

29. An optical signal processor according to claim 28, wherein said convergent optical system has a focusable entrance pupil diameter smaller than the diameter of light outputted from said first optical system.

30. An optical signal processor according to claim 28, wherein said monitor part includes an optical waveguide having an end face for receiving the light converged by said convergent optical system, said optical waveguide guiding the received light.

31. An optical signal processor according to claim 30, wherein said monitor part includes a plurality of sets of convergent optical systems and optical waveguides.

32. An optical signal processor according to claim 21, wherein said monitor part includes:
an optical filter for selectively transmitting therethrough a specific wavelength component in the received light; and
a power detecting part for detecting the power of light transmitted through said optical filter.

33. An optical signal processor according to claim 32, wherein the wavelength transmitted through said optical filter is variable.

34. An optical signal processor according to claim 21, wherein a plurality of wavelengths are transmitted through said optical filter.

35. An optical signal processor according to claim 21, further comprising:
a monitor light source part for outputting monitor light; and
monitor light introducing means for inputting the monitor light outputted from said monitor light source part into said input port.

36. An optical signal processor according to claim 35, wherein said monitor light source part is adapted to output monitor light having a wavelength different from a center wavelength of the light to be processed.

37. An optical signal processing method of processing light by using an optical signal processor according to claim 21, said method comprising the step of controlling a spatial modulation of the amplitude or phase of the wavelength components in accordance with a monitoring result by said monitor part, so as to adjust a processing state of the light outputted from said output port after being fed into said input port.

38. An optical signal processing method according to claim 37, wherein the spatial modulation of the amplitude or phase of the wavelength components in said modulating part is feedforward-controlled in accordance with the monitoring result by using a relationship between the monitoring result and processing state determined beforehand.

39. An optical signal processing method according to claim 37, wherein the spatial modulation of the amplitude or phase of the wavelength components in said monitoring part is feedback-controlled in accordance with the monitoring result such that the processing state attains a desirable value.

40. An optical signal processor for subjecting light to processing according to a wavelength of the light, and outputting the processed light, said optical signal processor comprising:
an input port for taking out the light to be processed;
an output port for outputting the processed light;
a first optical system for receiving the light fed into said input port and outputting the received light;
a first wavelength branching device for inputting the light outputted from said first optical system, spatially splitting wavelength components included in the light, and outputting the split wavelength components to optical paths different from each other;
a second optical system for converging the wavelength components outputted from said first wavelength branching device;
a modulating part for spatially modulating an amplitude or phase of the wavelength components converged by said second optical system, and outputting the modulated wavelength components;
a third optical system for receiving the wavelength components outputted from said modulating part and outputting the received wavelength components;
a second wavelength branching device for inputting the wavelength components outputted from said third optical system, multiplexing the wavelength components, and outputting the multiplexed light;
optical path turning means for turning an optical path of the light outputted from said second wavelength branching device, so as to output the light from said output port by way of said second wavelength branching device, said third optical system, said modulating part, said second optical system, said first wavelength branching device, and said first optical system in succession;
a monitor light source part for making monitor light from said first optical system incident on said first wavelength branching device; and
a monitor part disposed at a position different from positions where said input port and said output port are disposed, said monitor part monitoring, after receiving the monitor light having passed said first wavelength branching device, said second optical system, said modulating part, said third optical system, and said second wavelength branching device in succession after being outputted from said monitor light source part, a spectrum of the received monitor light or a power of a specific wavelength component in the received monitor light.

41. An optical signal processor according to claim 40, wherein at least one of said first and second wavelength branching devices includes a diffraction grating device.

42. An optical signal processor according to claim 40, wherein said modulating part includes a reflecting surface.

43. An optical signal processor according to claim 42, wherein the reflecting surface has a variable curvature or inclination.

44. An optical signal processor according to claim 42, wherein said second and third optical systems are common with each other.

45. An optical signal processor according to claim 42, wherein said first and second wavelength branching devices are common with each other.

46. An optical signal processor according to claim 40, wherein said monitor part includes a convergent optical system for converging the light to be monitored.

47. An optical signal processor according to claim 46, wherein said convergent optical system has a focusable entrance pupil diameter smaller than the diameter of light outputted from said first optical system.

48. An optical signal processor according to claim 46, wherein said monitor part includes an optical waveguide having an end face for receiving the light converged by said convergent optical system, said optical waveguide guiding the received light.

49. An optical signal processor according to claim 48, wherein said monitor part includes a plurality of sets of convergent optical systems and optical waveguides.

50. An optical signal processor according to claim 40, wherein said monitor part includes:
an optical filter for selectively transmitting therethrough a specific wavelength component in the received light; and
a power detecting part for detecting the power of light transmitted through said optical filter.

51. An optical signal processor according to claim 50, wherein the wavelength transmitted through said optical filter is variable.

52. An optical signal processor according to claim 40, wherein a plurality of wavelengths are transmitted through said optical filter.

53. An optical signal processing method of processing light by using an optical signal processor according to claim 40, said method comprising the step of controlling a spatial modulation of the amplitude or phase of the wavelength components in accordance with a monitoring result by said monitor part, so as to adjust a processing state of the light outputted from said output port after being fed into said input port.

54. An optical signal processing method according to claim 53, wherein the spatial modulation of the amplitude or phase of the wavelength components in said modulating part is feedforward-controlled in accordance with the monitoring result by using a relationship between the monitoring result and processing state determined beforehand.

55. An optical signal processing method according to claim 53, wherein the spatial modulation of the amplitude or phase of the wavelength components in said monitoring part is feedback-controlled in accordance with the monitoring result such that the processing state attains a desirable value.

56. An optical signal processor for subjecting light to processing according to a wavelength of the light, and outputting the processed light, said optical signal processor comprising:
an input port for taking out the light to be processed;
an output port for outputting the processed light;
a first optical system for receiving the light fed into said input port and outputting the received light;
a first wavelength branching device for inputting the light outputted from said first optical system, spatially splitting wavelength components included in the light, and outputting the split wavelength components to optical paths different from each other;
a second optical system for converging the wavelength components outputted from said first wavelength branching device;
a modulating part for spatially modulating an amplitude or phase of the wavelength components converged by said second optical system, and outputting the modulated wavelength components;
a third optical system for receiving the wavelength components outputted from said modulating part and outputting the received wavelength components;
a second wavelength branching device for inputting the wavelength components outputted from said third optical system, multiplexing the wavelength components, and outputting the multiplexed light;
a fourth optical system for guiding to said output port the light outputted from said second wavelength branching device;
a monitor light source part for making monitor light from said first optical system incident on said first wavelength branching device; and
a monitor part disposed at a position different from positions where said input port and said output port are disposed, said monitor part monitoring, after receiving the monitor light having passed said first wavelength branching device, said second optical system, said modulating part, said third optical system, and said second wavelength branching device in succession after being outputted from said monitor light source part, a spectrum of the received monitor light or a power of a specific wavelength component in the received monitor light.

57. An optical signal processor according to claim 56, wherein at least one of said first and second wavelength branching devices includes a diffraction grating device.

58. An optical signal processor according to claim 56, wherein said modulating part includes a reflecting surface.

59. An optical signal processor according to claim 58, wherein the reflecting surface has a variable curvature or inclination.

60. An optical signal processor according to claim 58, wherein said second and third optical systems are common with each other.

61. An optical signal processor according to claim 58, wherein said first and second wavelength branching devices are common with each other.

62. An optical signal processor according to claim 52, wherein said monitor part includes a convergent optical system for converging the light to be monitored.

63. An optical signal processor according to claim 62, wherein said convergent optical system has a focusable entrance pupil diameter smaller than the diameter of light outputted from said first optical system.

64. An optical signal processor according to claim 62, wherein said monitor part includes an optical waveguide having an end face for receiving the light converged by said convergent optical system, said optical waveguide guiding the received light.

65. An optical signal processor according to claim 64, wherein said monitor part includes a plurality of sets of convergent optical systems and optical waveguides.

66. An optical signal processor according to claim 56, wherein said monitor part includes:
an optical filter for selectively transmitting therethrough a specific wavelength component in the received light; and
a power detecting part for detecting the power of light transmitted through said optical filter.

67. An optical signal processor according to claim 66, wherein the wavelength transmitted through said optical filter is variable.

68. An optical signal processor according to claim 56, wherein a plurality of wavelengths are transmitted through said optical filter.

69. An optical signal processing method of processing light by using an optical signal processor according to claim 56, said method comprising the step of controlling a spatial modulation of the amplitude or phase of the wavelength components in accordance with a monitoring result by said monitor part, so as to adjust a processing state of the light outputted from said output port after being fed into said input port.

70. An optical signal processing method according to claim 69, wherein the spatial modulation of the amplitude or phase of the wavelength components in said modulating part is feedforward-controlled in accordance with the monitoring result by using a relationship between the monitoring result and processing state determined beforehand.

71. An optical signal processing method according to claim 69, wherein the spatial modulation of the amplitude or phase of the wavelength components in said monitoring part is feedback-controlled in accordance with the monitoring result such that the processing state attains a desirable value.

* * * * *